United States Patent
Chen et al.

(10) Patent No.: US 9,350,581 B2
(45) Date of Patent: May 24, 2016

(54) DOWNLINK ASSIGNMENT INDICATOR DESIGN FOR MULTI-CARRIER WIRELESS COMMUNICATION

(75) Inventors: Wanshi Chen, San Diego, CA (US); Juan Montojo, San Diego, CA (US); Jelena M. Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 1547 days.

(21) Appl. No.: 12/791,746

(22) Filed: Jun. 1, 2010

(65) Prior Publication Data

US 2011/0128922 A1 Jun. 2, 2011

Related U.S. Application Data

(60) Provisional application No. 61/183,496, filed on Jun. 2, 2009.

(51) Int. Cl.
*H04W 4/00* (2009.01)
*H04L 27/26* (2006.01)
*H04L 5/00* (2006.01)

(52) U.S. Cl.
CPC .......... *H04L 27/2601* (2013.01); *H04L 5/0007* (2013.01); *H04L 5/0053* (2013.01); *H04L 5/0094* (2013.01); *H04L 5/0023* (2013.01)

(58) Field of Classification Search
USPC ......... 370/330, 329, 337, 348, 349, 444, 447, 370/343, 345, 347, 338, 336, 389, 401, 400, 370/442, 443, 445, 468, 44; 455/450, 509
See application file for complete search history.

(56) References Cited

U.S. PATENT DOCUMENTS 5,754,537 A * 5/1998 Jamal ............................ 370/330
6,167,125 A * 12/2000 Nakaoka et al. ......... 379/142.01
(Continued)

FOREIGN PATENT DOCUMENTS

CN 1951142 A 4/2007
KR 20080070711 A 7/2008
(Continued)

OTHER PUBLICATIONS

Ericsson: "Characterization of downlink control signaling for LTEAdvanced", 3GPP Draft; R1-090907, 3rd Generation Partnership Project (3GPP), Mobile Competence Centre ; 650, Route Des Lucioles ; F-06921 Sophia-Antipolis Cedex ; France, no. Athens, Greece; 20090203, Feb. 3, 2009, XP050318749, [retrieved on Feb. 3, 2009].

(Continued)

*Primary Examiner* — Chi H Pham
*Assistant Examiner* — Alexander O Boakye
(74) *Attorney, Agent, or Firm* — Dalei Dong

(57) ABSTRACT

Systems and methodologies are described herein that facilitate various techniques for enhanced downlink assignment index (DAI) signaling in a multi-carrier wireless communication system. As described herein, DAI and/or other indicator signaling transmitted on a first carrier can be configured to carry information relating to a number of downlink transmission assignments applied to at least a second carrier, which in some cases can be disparate from the first carrier. To these ends, described herein are techniques for cross-carrier DAI signaling, multiple DAI signaling, aggregate DAI signaling, and other similar techniques. As additionally described herein, DAI signaling can be related to downlink control transmissions and/or downlink data transmissions in connection with respective techniques that can be applied to the DAI signaling.

50 Claims, 14 Drawing Sheets

(56) References Cited

U.S. PATENT DOCUMENTS

| | | | |
|---|---|---|---|
| 7,848,302 B1* | 12/2010 | Talley et al. | 370/342 |
| 7,957,761 B2* | 6/2011 | Ryu et al. | 455/524 |
| 8,089,940 B2 | 1/2012 | Rezaiifar et al. | |
| 8,249,010 B2* | 8/2012 | Fan et al. | 370/329 |
| 8,345,605 B2* | 1/2013 | Shen et al. | 370/329 |
| 8,358,594 B2* | 1/2013 | Lee et al. | 370/254 |
| 8,441,996 B2* | 5/2013 | Kim et al. | 370/329 |
| 8,942,142 B2* | 1/2015 | Lin | 370/329 |
| 2004/0125768 A1* | 7/2004 | Yoon et al. | 370/331 |
| 2007/0070908 A1* | 3/2007 | Ghosh et al. | 370/236 |
| 2007/0097908 A1 | 5/2007 | Khandekar et al. | |
| 2007/0281642 A1* | 12/2007 | Gorokhov | 455/185.1 |
| 2008/0051087 A1 | 2/2008 | Ryu et al. | |
| 2009/0040975 A1* | 2/2009 | Vijayan et al. | 370/329 |
| 2009/0129317 A1* | 5/2009 | Che et al. | 370/328 |
| 2011/0026449 A1* | 2/2011 | Kuo | 370/311 |
| 2011/0116457 A1 | 5/2011 | Damnjanovic et al. | |

FOREIGN PATENT DOCUMENTS

| | | |
|---|---|---|
| KR | 20090039591 A | 4/2009 |
| RU | 2300175 | 5/2007 |
| WO | 03032564 | 4/2003 |

OTHER PUBLICATIONS

Erik Dahlman: "3G Evolution HSPA and LTE for Mobile Broadband", Jan. 1, 2008, Academic Press, UK, XP002619372, pp. 458-458,.

Erik Dahlman: "3G Evolution Hspa and LTE for Mobile Broadband", Jan. 1, 2008, Academic Press, UK, XP002619373, pp. 543-544.
International Search Report and Written Opinion—PCT/US2010/037097, International Search Authority—European Patent Office—Feb. 10, 2011.
Ericsson: "Details of ACK/NAK bundling for TDD", TSG-RAN WG1 #53, R1-082002, May 9, 2008.
Ericsson: "Remaining issues for TDD ACK/NAK bundling and PUSCH", TSG-RAN WG1 #53bis, R1-082462, Jul. 4, 2008.
Nokia et al., "DL control signalling to support extended bandwidth", 3GPP Draft; R1-090722, 3rd Generation Partnership Project (3GPP), Mobile Competence Centre ; 650, Route Des Lucioles; F-06921 Sophia-Antipolis Cedex ; France, no. Athens, Greece; 20090203, Feb. 3, 2009, XP050318589, [retrieved on Feb. 3, 2009].
Nokia et al., "L1 control signaling with carrier aggregation in LTE-Advanced", 3GPP Draft; R1-083730, 3rd Generation Partnership Project (3GPP), Mobile Competence Centre ; 650, Route Des Lucioles ; F-06921 Sophia-Antipolis Cedex ; France, no. Prague, Czech Republic; 20080924, Sep. 24, 2008, XP050317069, [retrieved on Sep. 24, 2008].
Texas Instruments: "Issues on Carrier Aggregation for Advanced E-UTRA", 3GPP Draft; R1-084443, 3rd Generation Partnership Project (3GPP), Mobile Competence Centre ; 650, Route Des Lucioles ; F-06921 Sophia-Antipolis Cedex ; France, no. Prague, Czech Republic; 20081105, Nov. 5, 2008, XP050317701, [retrieved on Nov. 5, 2008].
ZTE: "Uplink Control Channel Design for LTE-Advanced", TSG-RAN WG1 #57, R1-091702, May 8, 2009.
Taiwan Search Report—TW099117805—TIPO—Apr. 19, 2014.

* cited by examiner

DOWNLINK ASSIGNMENT INDICATOR DESIGN FOR MULTI-CARRIER WIRELESS COMMUNICATION

CROSS-REFERENCE

This application claims the benefit of U.S. Provisional Application Ser. No. 61/183,496, filed Jun. 2, 2009, and entitled "SYSTEMS AND METHODS OF DAI DESIGN FOR LTE-A TDD SYSTEMS," the entirety of which is incorporated herein by reference.

BACKGROUND

I. Field

The present disclosure relates generally to wireless communications, and more specifically to techniques for managing resource assignments in a multi-carrier wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

A MIMO system can support time division duplex (TDD) and frequency division duplex (FDD) systems. In a TDD system, forward and reverse link transmissions can be made on a shared frequency region so that the reciprocity principle can be used to enable estimation of a forward link channel separate from a reverse link channel. In turn, this can enable an access point to implement transmit beamforming gain on the forward link when multiple antennas are available at the access point.

Further, for various TDD systems utilizing orthogonal frequency division multiplexing (OFDM), a plurality of downlink subframes can generally be associated with one or more uplink subframes for feedback communication. A group of downlink subframes assigned to fewer uplink subframes for feedback communication is conventionally referred to as a bundling window. Thus, a device receiving transmissions on resources within a bundling window can perform feedback operations on the designated uplink subframe(s) for the bundling window. One type of feedback mode for TDD systems is acknowledgment (ACK)/negative acknowledgment (NACK) messaging, in which case a grouping of downlink subframes can be referred to as an ACK/NACK bundling window. Downlink transmissions received by the UE within this ACK/NACK bundling window are acknowledged on the uplink subframe(s). This bundling window design for wireless signals can result in more efficient utilization of downlink and uplink signal resources, providing an overall improvement for wireless communication systems.

In view of at least the above, it would be desirable to implement techniques by which bundling windows can be assigned, managed, and/or utilized in a multi-carrier wireless communication environment in a substantially efficient manner.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying a plurality of carriers configured for communication in a wireless communication system; determining a number of downlink transmission assignments associated with one or more first carriers in the plurality of carriers; and configuring, for communication over at least one or more second carriers in the plurality of carriers, at least one indication that specifies the number of downlink transmission assignments associated with at least the one or more first carriers.

A second aspect described herein relates to a wireless communications apparatus, which can comprise a memory that stores data relating to a plurality of carriers configured for communication in a wireless communication system. The wireless communications apparatus can further comprise a processor configured to determine a number of downlink transmission assignments associated with one or more first carriers in the plurality of carriers and to configure, for communication over one or more second carriers in the plurality of carriers, at least one indication that specifies the number of downlink transmission assignments associated with at least the one or more first carriers.

A third aspect relates to an apparatus, which can comprise means for identifying a plurality of carriers associated with a wireless communication system, at least one first carrier in the plurality of carriers, and at least one second carrier in the plurality of carriers; means for obtaining information relating to a number of downlink transmission assignments applied to the at least one first carrier; and means for generating a downlink assignment index (DAI) for transmission on the at least one second carrier that specifies the number of downlink transmission assignments applied to the at least one first carrier.

A fourth aspect described herein relates to a computer program product, which can include a computer-readable medium that comprises code for causing a computer to identify a plurality of carriers associated with a wireless communication system, at least one first carrier in the plurality of carriers, and at least one second carrier in the plurality of carriers; code for causing a computer to obtain information relating to a number of downlink transmission assignments applied to the at least one first carrier; and code for causing a computer to generate a DAI for transmission on the at least one second carrier that specifies the number of downlink transmission assignments applied to the at least one first carrier.

According to a fifth aspect, a method is described herein, which can comprise identifying a plurality of carriers configured for communication with a wireless communication network; obtaining transmission assignment signaling from the wireless communication network over at least one or more first carriers in the plurality of carriers; and determining, based on the transmission assignment signaling, a number of downlink transmission assignments associated with at least one or more second carriers in the plurality of carriers.

A sixth aspect described herein relates to a wireless communications apparatus, which can comprise a memory that stores data relating to a plurality of carriers configured for communication with a wireless communication network. The wireless communications apparatus can further comprise a processor configured to obtain transmission assignment signaling from the wireless communication network over at least one or more first carriers in the plurality of carriers and to determine, based on the transmission assignment signaling, a number of downlink transmission assignments associated with at least one or more second carriers in the plurality of carriers.

A seventh aspect relates to an apparatus, which can comprise means for identifying a plurality of carriers designated for communication with a wireless communication network, at least one first carrier in the plurality of carriers, and at least one second carrier in the plurality of carriers; means for obtaining one or more DAIs from the wireless communication network on the at least one first carrier; and means for determining a number of downlink transmission assignments applied to the at least one second carrier based on the one or more DAIs.

An eighth aspect described herein relates to a computer program product, which can include a computer-readable medium that comprises code for causing a computer to identify a plurality of carriers designated for communication with a wireless communication network, at least one first carrier in the plurality of carriers, and at least one second carrier in the plurality of carriers; code for causing a computer to obtain one or more DAIs from the wireless communication network on the at least one first carrier; and code for causing a computer to determine a number of downlink transmission assignments applied to the at least one second carrier based on the one or more DAIs.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
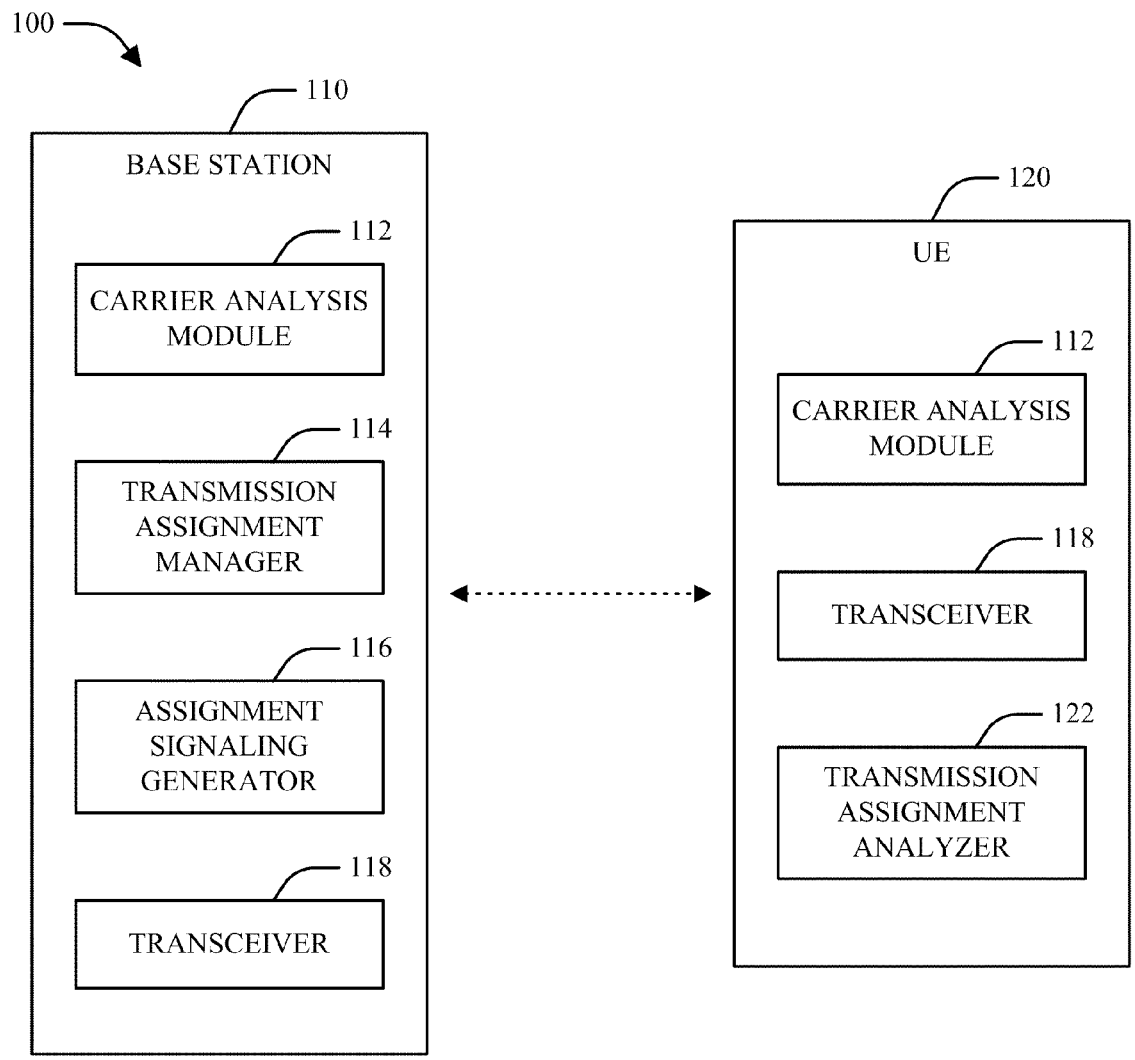
FIG. 1 is a block diagram of a system that facilitates generation and processing of downlink assignment indication messaging in a multi-carrier wireless communication environment in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 that facilitates generation and processing of downlink assignment indication messaging in a multi-carrier wireless communication environment in accordance with various aspects described herein. As FIG. 1 illustrates, system 100 can include one or more base stations 110 (also referred to herein as Node Bs or eNBs, cells or network cells, nodes or network nodes, access points (APs), etc.), which can communicate with one or more user equipment units (UEs, also referred to herein as access terminals (ATs), mobile or user stations, mobile devices, mobile terminals, etc.) 120 via respective transceivers 118. In accordance with one aspect, base station 110 can engage in one or more downlink (DL, also referred to herein as forward link (FL)) communications to UE 120, and UE 120 can engage in one or more uplink (UL, also referred to herein as reverse link (RL)) communications with base station 110. Additionally or alternatively, base station 110 and/or UE 120 can engage in any suitable communication(s) with each other, with other devices or entities in system 100, and/or any other suitable entities.

In accordance with one aspect, in various wireless communication systems (e.g., TDD systems, etc.), one UL subframe can be associated with multiple DL subframes. Multiple DL subframes associated with an UL subframe in this manner is referred to herein and generally in the art as a DL subframe bundling window. For DL transmissions within the same bundling window, UL feedback, such as acknowledgement/negative acknowledgement (ACK/NAK) signaling, can be configured to be fed back in the corresponding UL subframe. In one example, ACK/NAK signaling can be made in response to and pertain to an expected or received signal(s), or one or more wireless resources demodulated at UE 120. Examples of suitable received/expected signals can include a predetermined number of data packets, a predetermined number of wireless resources (e.g., time-frequency resources, OFDM symbols, code resources, time frames or subframes, etc.), or the like. Thus, as an example, a network protocol can configure UE 120 to send an ACK/NAK for a number, N, of received data packets, or for N DL resource blocks, or after expiration of X amount of time, or some combination thereof (where X and N are non-negative integers). If all expected signals or packets are received, UE 120 can send an ACK feedback signal, and otherwise sends a NAK feedback signal. Alternatively, other types of feedback can be employed, such as automatic repeat request (ARQ) signaling, hybrid ARQ (HARD) signaling, or the like.

One type of ACK/NAK feedback mode that can be utilized by UE 120 in an example as provided above is called ACK/NAK bundling, where multiple ACK/NAKs within a bundling window are logically bundled into one ACK/NAK (e.g., by performing a logical AND operation). Additionally or alternatively, another type of ACK/NAK feedback that can be utilized by UE 120 is called ACK/NAK multiplexing, where up to 4 bits of ACK/NAK can be fed back.

In some cases, it can be appreciated that UE 120 can miss signaling from base station 110 (e.g., on a Physical Downlink Control Channel (PDCCH) and/or other suitable channel or combination of channels) that provides resource grants and/or other transmission assignment information. Consequently, in cases where UE 120 misses such signaling, base station 110 and UE 120 can have different interpretations on how many data transmissions (e.g., Physical Downlink Shared Channel (PDSCH) transmissions, etc.) are to be performed within the bundling window.

Accordingly, to resolve and/or alleviate such misalignment, a 2-bit downlink assignment index (DAI) field can be utilized in connection with various UL downlink control information (DCI) formats and/or DL DCI formats utilized for transmission of control signaling within system 100. For example, base station 110 can utilize a DAI field within one or more DL DCI formats to indicate an accumulative number of DL assignments within a bundling window. Thus, by way of example, a DAI field corresponding to a first assigned downlink transmission in a bundling window can indicate one assignment, a DAI field corresponding to a second downlink transmission in the bundling window can indicate two assignments, and so on. Additionally or alternatively, base station 110 can utilize a DAI field within one or more UL DCI formats to indicate a total number of DL assignments within a bundling window. Thus, by way of example, in the event that n downlink transmissions are assigned for a bundling window, DAI fields corresponding to each of the n assigned downlink transmissions can indicate n assignments.

In accordance with another aspect, it can be appreciated that as a need exists in a TDD system and/or other suitable wireless communication systems for UE 120 to feed back information on a single UL subframe that corresponds to multiple DL subframes, UE 120 can in some cases be required to have knowledge of how many DL transmissions have been scheduled in a given bundling window. Further, it can be appreciated that there may in some cases not be a guarantee to have any UL control signaling within a given bundling window. If such signaling is given and UE 120 successfully decodes the signaling, it can be appreciated that base station 110 and UE 120 can be substantially perfectly aligned in terms of the total number of DL transmissions within the corresponding bundling window. Thus, with the aid of DAIs provided with DL control signaling, UE 120 can efficiently feedback the corresponding ACK/NAK information. Alternatively, if UL control PDCCH and/or other control signaling does not exist, UE 120 can in some cases be required to rely on the DAI field given within DL control signaling. However, due to the accumulative nature of DAI information in DL signaling, the loss of the last DL control signal(s) in a given bundling window can cause misalignment between base station 110 and UE 120 regarding the total number of DL data transmissions, making it difficult for efficient ACK/NAK feedback. It can further be appreciated that with regard to DAI information transmitted on PDCCH and/or other suitable control channels between base station 110 and UE 120, transmissions on such control channels can in some cases have a relatively high tolerable loss rate (e.g., approximately 1%, etc.) as compared to ACK/NAK signaling and/or other forms of signaling. In view of the above, it would be desirable to implement improved techniques for improving ACK/NAK performance within a given bundling window. Further, as further described herein, it would be desirable to implement techniques by which multiple carriers utilized by a wireless communication system can be leveraged to enhance DAI transmission and/or processing.

In view of at least the above, base station 110 and/or UE 120 can operate in accordance with various aspects as described herein to facilitate enhanced signaling and processing of DAIs and/or other indicators of the number of transmission assignments applied to various carriers in a multi-carrier system. For example, base station 110 can include a carrier analysis module 112 and/or other suitable mechanisms to identify a plurality of carriers configured for communication in a wireless communication system. Further, base station 110 can include a transmission assignment manager 114 and/or other suitable mechanisms to determine a number of DL transmission assignments associated with one or more first carriers in the plurality of carriers. In addition, base station 110 can include an assignment signaling generator 116 that can configure, for communication (e.g., via transceiver 118) over at least one or more second carriers in the plurality of carriers, at least one indication that specifies the number of DL transmission assignments associated with at least the one or more first carriers. In one example, the one or more second carriers can be disparate from the one or more first carriers.

Correspondingly, UE 120 in system 100 can include a carrier analysis module 112 that can identify a plurality of carriers configured for communication with base station 110 and/or any suitable entity associated with a wireless communication network. UE 120 can further include a transceiver 118 and/or other mechanisms to obtain transmission assignment signaling from base station 110 over at least one or more first carriers in the plurality of carriers, based on which a transmission assignment analyzer 122 or the like can determine a number of DL transmission assignments associated with at least one or more second carriers in the plurality of carriers. In one example, the one or more second carriers can be disparate from the one or more first carriers. In another example, transmission assignment signaling communicated from base station 110 to UE 120 can include DL transmission assignments and/or UL transmission assignments.

In accordance with one aspect, a number of DL transmission assignments identified by transmission assignment manager 114 at base station 110 can be a number of DL transmission assignments associated with one or more first carriers over a predefined duration in time (e.g., corresponding to a number of subframes and/or any other suitable time increments). Similarly, transmission assignment analyzer 122 at UE 120 can be utilized to determine, based on signaling from base station 110, a number of DL transmission assignments associated with one or more second carriers (that are disparate from one or more first carriers on which the signaling is received) over a predefined duration in time.

In accordance with various aspects, base station 110 can signal various types of DAI signaling and/or other indicator signaling to UE 120 to indicate a number of transmission assignments associated with a carrier other than that on which the signaling is provided. For example, base station 110 can utilize cross-carrier DAI signaling, multiple DAI signaling, aggregate DAI signaling, and/or any other suitable signaling type(s). Various examples of such signaling types are provided in further detail herein. It is to be appreciated that, unless explicitly stated otherwise, the description and claims provided herein are not intended to be limited to any specific type(s) of signaling that can be conducted by base station 110 and/or processed by UE 120.

Figure 2:
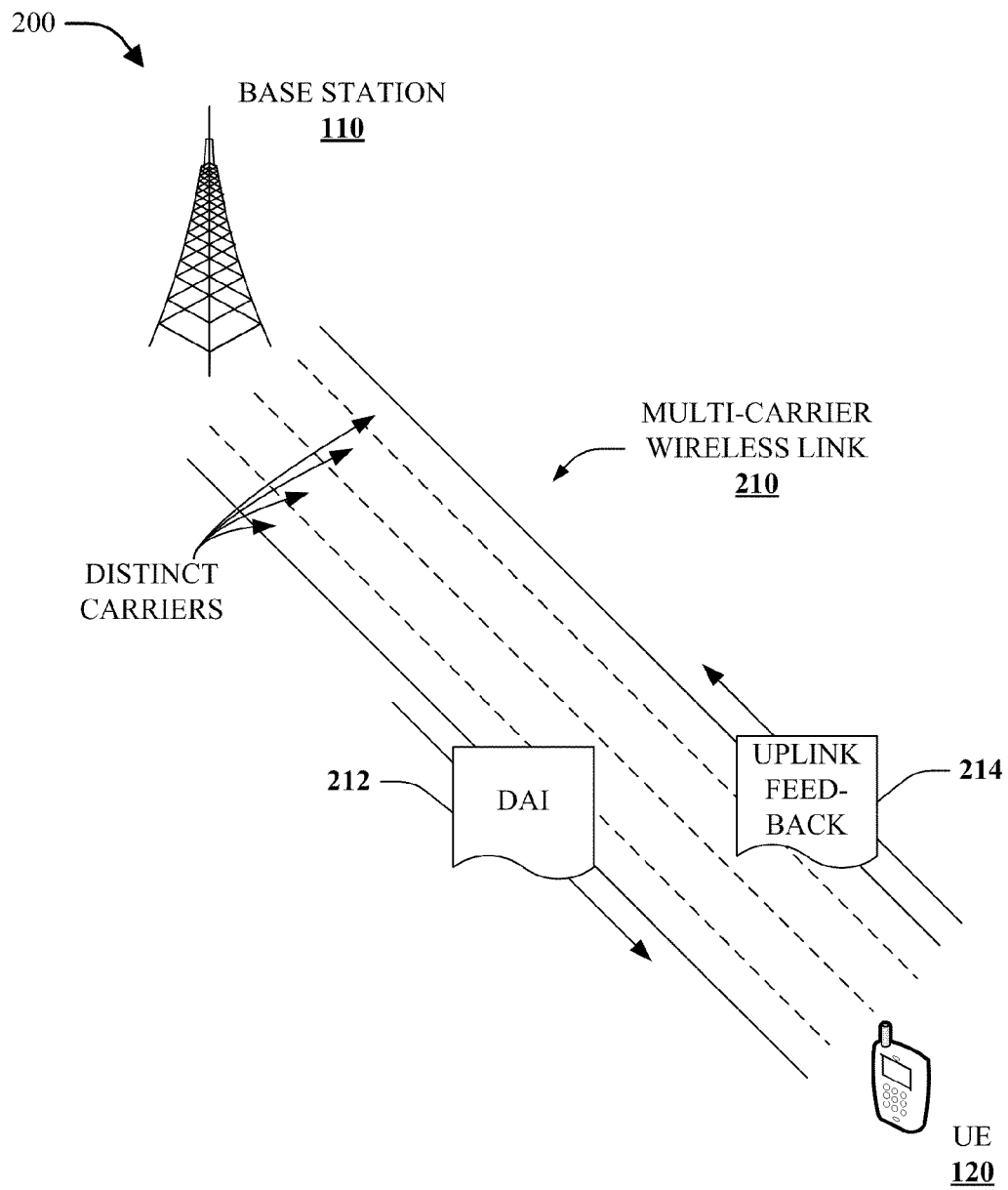
FIG. 2 illustrates an example wireless communication system that facilitates multi-carrier communication in accordance with various aspects.

Referring now to FIG. 2, a block diagram of an example system 200 that facilitates multi-carrier wireless communication in accordance with various aspects is illustrated. In one example, system 200 can facilitate improved reliability for feedback signaling pertaining to multi-carrier wireless communication. As a result, system 200 can achieve reduced re-transmission of control or traffic (whether voice or data traffic), thereby increasing overall wireless communication efficiency.

As shown in FIG. 2, system 200 can include a base station 110, which can be communicatively coupled with a UE 120 via a multi-carrier wireless link 210. Multi-carrier wireless link 210 can, in turn, include two or more distinct carrier frequencies. While FIG. 2 depicts four distinct carriers, it should be appreciated that such illustration is provided merely as an example and is not intended to be construed as limiting the number of carriers that can be employed in the context of multi-carrier wireless link 210. In accordance with one aspect, DL and/or UL communication between base station 110 and UE 120 can be conducted over one or more of the distinct carriers of multi-carrier wireless link 210. DL signals can be transmitted from base station 110 to UE 120 and can include, for example, control signals (e.g., PDCCH), traffic signals (e.g., PDSCH), or the like. Likewise, UL signals transmitted from UE 120 to base station 110 can include control signals (e.g., ACK/NAK, channel feedback, scheduling requests, sounding reference signals (SRS), etc.), traffic signals (e.g., Physical Uplink Shared Channel (PUSCH) signaling), etc.

In accordance with another aspect, various UL and DL signals can be assigned by base station 110 for transmission on any one of the distinct carriers of multi-carrier wireless link 210, or a group of such distinct carriers. Further, carrier assignments can be changed over time. As an illustrative example, a set of DL control signals can be transmitted on a first subset of carriers in one signal time frame (e.g., a frame, subframe, time slot, subslot, etc.), on a second subset of the carriers in a subsequent signal time frame, and so on. Feedback signals assigned to the set of DL control signals can likewise be assigned to a subset of the carriers, which can be the same subset of carriers employed for the DL control signals or a different subset of the carriers.

Because a DL transmission (of control signals or traffic signals) can be transmitted over multiple carriers by base station 110, it can be appreciated that UE 120 can be configured to monitor multiple carriers in order to determine whether individual signals corresponding to the DL transmission are received at UE 120. Subsequently, UL feedback signals can be transmitted by UE 120 in response to the DL transmission. To assist UE 120 in monitoring and receiving the individual signals of the DL transmission, base station 110 can transmit a DAI 212 on a first subset of carriers that provides an indication of a total number of signals of the DL transmission that are transmitted on at least one additional subset of the carriers. Such a DAI 212 can be a cross-carrier DAI, a set of multiple DAIs, an aggregate DAI, and/or any other form of signaling suitable to indicate DL transmission assignments on carrier(s) other than those on which the DAI is transmitted. Additionally or alternatively, DAI 212 can identify a total number of signals of a DL transmission that are transmitted on the first subset of carriers as well, or this information can be transmitted in a separate DAI (not shown). Accordingly, UE 120 can determine whether DL signals received within a DL bundling window comprise a complete transmission (e.g., all of the individual signals of the DL transmission) or an incomplete transmission.

In addition to the foregoing, DAI 212 can be employed by UE 120 to coordinate signaling of UL feedback 214 corresponding to DL transmissions within a given DL bundling window. The manner in which signaling of UL feedback 214 is performed can be according to a default arrangement (e.g., as specified in a network standard, etc.), configured by base station 110 on a per-UE or per-cell basis, or the like.

In accordance with one aspect, DAI 212 can comprise DL signaling information pertaining to a single carrier, other than a carrier employed by base station 110 to transmit DAI 212 (herein referred to as a DL DAI carrier). In this case, UE 120 can perform ACK/NAK signaling for the single carrier. In one example, such ACK/NAK signaling can be accomplished with as few as one data bit, e.g., to indicate that either all transmissions corresponding to DAI 212 on the single carrier have been received, or have not been received. Alternatively, multiple data bits can be utilized, e.g., to specify particular received transmissions and/or to specify particular transmission that were not received.

In accordance with another aspect, DAI 212 can include DL signaling information for a plurality of carriers, including the DL DAI carrier, but which also includes at least one additional carrier. In this case, DAI 212 can specify information for the plurality of carriers, including one or more signal time slots per carrier (where a signal time slot can be, e.g., a signal subframe, signal subslot, signal frame or slot, or other suitable time-based division of a DL signal). Alternatively, a plurality of DAIs 212 can be sent by base station 110 that provide DL signaling information for one or more of the plurality of carriers, or one or more signal time slots per carrier, or any other suitable combination of carriers and signal time slots.

Figure 3:
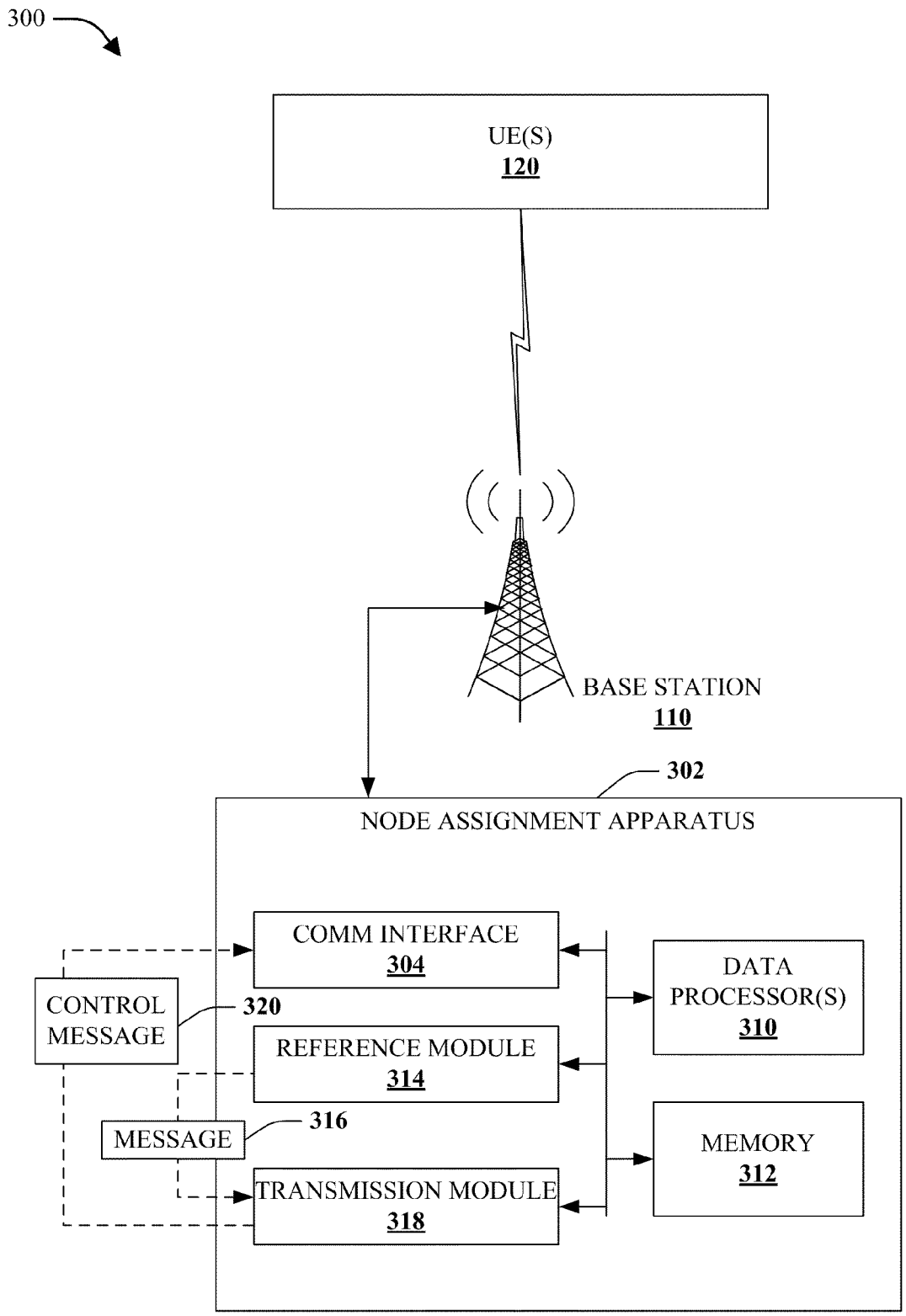
FIG. 3 illustrates an example wireless communication environment that supports feedback for multi-carrier communication in accordance with various aspects.

Turning next to FIG. 3, an example system 300 that facilitates multi-carrier wireless communication in accordance with various aspects is illustrated. System 300 can comprise a base station 110, which can be coupled with one or more UEs 120. In addition, base station 110 can include or can be communicatively coupled with a node assignment apparatus 302. Node assignment apparatus 302 can be configured to support multi-carrier wireless communication by, e.g., providing UE(s) 120 with information that indicates respective carriers on which individual DL transmissions (e.g., associated with one or more UL feedback resources) are assigned within a DL bundling window. This information can be explicitly signaled by node assignment apparatus 302, or can be implicitly specified in a network specification (e.g., with minimal or no higher layer signaling) and/or in any other suitable manner.

In one example, node assignment apparatus 302 can comprise a communication (comm.) interface 304 for communicating with UE(s) 120. Communication interface 304 can correspond to a transmit-receive chain of base station 110, or can include a separate electronic communication entity configured to utilize or communicate with this transmit-receive chain. In addition, node assignment apparatus 302 can comprise a memory 312 for storing instructions configured to facilitate multi-carrier wireless service for UE(s) 120 operating within a wireless network associated with base station 110, and a data processor 310 for executing modules to implement the instructions. For example, such modules can include a reference module 314 that forms a wireless message 316 for associating a set of DL transmissions on a first wireless carrier to an UL feedback resource. This association can be established with one or more DAIs, as described herein. Furthermore, node assignment apparatus 302 can comprise a transmission module 318 that encodes the wireless message onto a control channel resource of a wireless signal (e.g., control message 320) and transmits the wireless message on a second wireless carrier to one or more UE(s) 120.

In accordance with one aspect, wireless message 316 can specify a total number of wireless carriers over which the set of DL transmissions are sent to UE(s) 120. In one example, wireless message 316 can further specify a total number of DL transmissions (e.g., independent DL signals) in the set of DL transmissions on respective carriers of the total number of wireless carriers. Accordingly, UE(s) 120 can readily track a number of DL transmissions per carrier that are received, thereby improving coordination between base station 110 and UE(s) 120 and increasing reliability of feedback signaling transmitted by UE(s) 120.

In accordance with another aspect, various options can be utilized by control message 320 to convey information about DL transmissions on carriers other than (and optionally in addition to) the second wireless carrier (e.g., the carrier employed to transmit control message 320). In one example, wireless message 316 can include a first data field that identifies the first wireless carrier and a second data field that specifies a total number of DL transmissions that are assigned to an UL feedback resource and that are transmitted on the first wireless carrier. In another example, wireless message 316 can be one of a set of wireless messages generated by reference module 314 and transmitted to UE(s) 120, each of which can specify a total number of DL transmissions assigned to the UL feedback resource that are transmitted on one respective subset of the set of wireless carriers. In this case, reference module 314 can generate different numbers of wireless messages and assign them to different subsets of the set of wireless carriers. As one example, the set of wireless messages comprises one wireless message 316 for each wireless carrier of the set of wireless carriers.

In one example, respective wireless messages 316 can include a cross-carrier DAI that identifies a total number of DL transmissions for one of the respective wireless carriers. Alternatively, one or more wireless messages 316 can comprise multiple DAIs, each specifying a total number of DL transmissions for a different carrier. As an example of this case, a set of wireless messages can include a number N of wireless messages (where N is a positive integer and is less than or equal to a number of the set of wireless carriers M), one for each anchor carrier of the set of wireless carriers (where the number of anchor carriers is less than or equal to M). At least one of the set of wireless messages can optionally include multiple DAIs, in effect bundling DL transmissions of a non-anchor carrier with DL transmissions of a corresponding anchor carrier. As another alternative, wireless message 316 can include one or more DAIs that logically bundle DL transmission information for a plurality of wireless carriers (e.g., with a logical AND operation). In this alternative, reference module 314 can identify within wireless message 316 a total number of DL transmissions on at least one other wireless carrier in addition to a total number of the set of DL transmissions on the first wireless carrier. In identifying DL transmissions, wireless message 316 can employ alternative formats for explicitly or implicitly conveying DL transmission information. In one instance, a DAI can specify total transmissions within a DL bundling window. In another instance, a DAI can specify accumulative DL transmissions over the DL bundling window.

Depending on an amount of information to be conveyed by wireless message 316 (e.g., how many DAIs are included, how many carriers are specified, etc.), different amounts of data may need to be reserved for this message. This can be accommodated in a network-wide standard, on a per-cell or per-UE basis, etc. Accordingly, reference module 314 can generate a number of data bits for wireless message 316 based on a controlling standard or configuration governing base station 110 and/or any other suitable factors.

In another example, DL transmissions corresponding to wireless message 316 can include either multi-carrier control or multi-carrier traffic transmissions, or both. Thus, for instance, a set of DL transmissions as referred to above can comprise data or voice traffic transmissions involving UE(s) 120 and transmitted at least in part on the first wireless carrier. In this case, wireless message 316 can be utilized to signal a total number of DL transmissions in the set of DL transmissions on the first wireless carrier. As another example, the set of DL transmissions can include control traffic transmissions involving UE(s) 120 and transmitted on the first wireless carrier. These control traffic transmissions can optionally pertain to data or voice traffic signals transmitted on an additional carrier (e.g., the second wireless carrier or a third wireless carrier). In this case, wireless message 316 can optionally specify only the total number of DL control transmissions, only the total number of DL voice or data traffic transmissions on the additional carrier, or both the DL control transmissions and the DL voice/data traffic transmissions. Whether wireless message 316 pertains to data or voice traffic transmissions, control traffic transmissions, or both can be specified in a standard for the wireless network, a cell-specific or UE-specific configuration stored in memory 312, or the like. In one example, reference module 314 can access memory 312 to retrieve this standard when generating wireless message 316.

Figure 4:
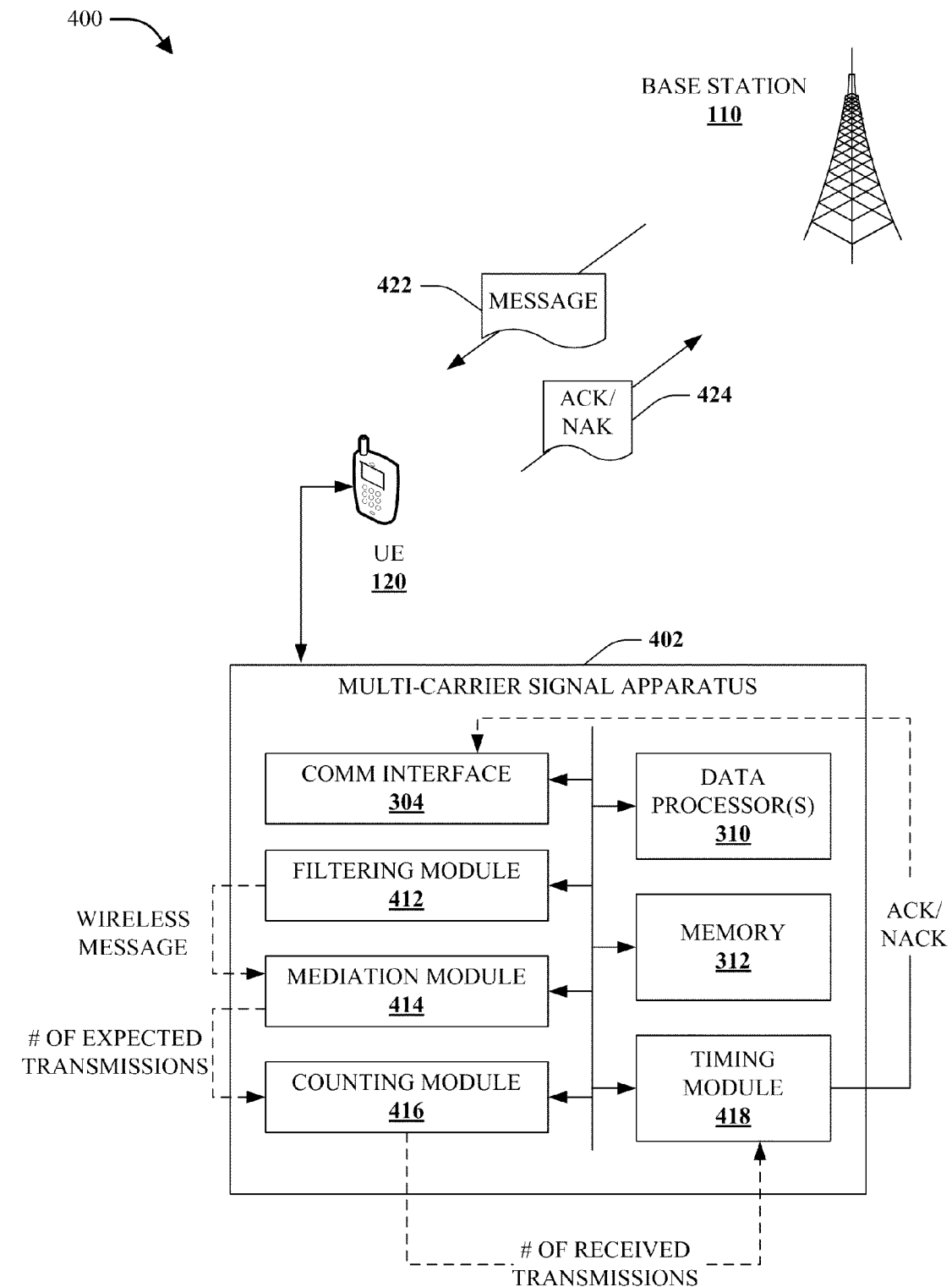
FIG. 4 is a block diagram of a system that facilitates cross-carrier and/or other signaling to support uplink feedback for multi-carrier communication in accordance with various aspects.

FIG. 4 illustrates a further system 400 that can be deployed in accordance with various aspects described herein. System 400 can include a UE 120, which can be wirelessly coupled with a base station 110 via a multi-carrier wireless link. In addition, UE 120 can include a multi-carrier signal apparatus 402, which can provide improved feedback signaling based on DAI signals provided by base station 110.

In one example, multi-carrier signal apparatus 402 can comprise a communication interface 304 for exchanging wireless signals with base station 110. Additionally, multi-carrier signal apparatus 402 can comprise a memory 312 for storing instructions that facilitate multi-carrier wireless communication as well as a data processor 310 that executes and/or otherwise implements modules to implement these instructions. In operation, base station 110 can transmit a wireless message 422 to UE 120. This wireless message 422 can be transmitted on one carrier of the multi-carrier wireless link and can provide DL bundling window information pertaining to at least a second carrier of the multi-carrier wireless link. The DL bundling window information can be specified in one or more DAIs having various formats as described herein.

In another example, multi-carrier signal apparatus 402 can employ a filtering module 412 that extracts wireless message 422 from a signal that is received by communication interface 304 over a first wireless carrier. In addition, a mediation module 414 can be employed that analyzes wireless message 422 and identifies a number of transmissions that are assigned to an UL feedback resource and that are to be received on a second wireless carrier. In this manner, multi-carrier signal apparatus 402 can monitor the second wireless carrier for the specified number of transmissions and determine whether the number of transmissions has or has not been successfully received at UE 120.

In accordance with one aspect, multi-carrier signal apparatus 402 can comprise a counting module 416 that monitors traffic received by communication interface 304 on the multi-carrier wireless link, and particularly at least on the second wireless carrier identified in wireless message 422. Further, counting module 416 can track and determine a number of received transmissions assigned to the UL feedback resource that are received at least on the second wireless carrier. This number of received transmissions can be compared with a number of expected transmissions on the second wireless carrier as provided by mediation module 414. Multi-carrier signal apparatus 402 can additionally comprise a timing module 418 that sets a NAK period for receiving the number of transmissions on the second wireless carrier. As one illustrative example, the NAK period can be based on a response time for ACK/NAK signaling 424 included in a network specification, or specified by base station 110. By way of specific, non-limiting example, the response time can be four subframes such that a transmission in subframe N must be responded to by UE 120 in subframe N+4. Alternatively, the NAK period can be any other suitable number of signal time slots.

In accordance with another aspect, multi-carrier signal apparatus 402 and/or other mechanisms associated with UE 120 can compare a DAI value obtained from base station 110 (e.g., via wireless message 422) with a detected number of DL transmissions received from base station 110. Based on this comparison, a layer 3 (L3) configured transmission scheme and/or any other suitable transmission scheme utilized by UE 120 (e.g., bundling, multiplexing, etc.), and the physical layer means of transmission utilized by UE 120 (e.g., on a Physical Uplink Control Channel (PUCCH), piggybacking on PUSCH, etc.), UE 120 can provide ACK/NAK signaling 424 to base station 110 accordingly.

As further described herein, wireless message 422 can comprise one or more DAIs respectively providing DL signal information pertaining to one or more carriers. The size of data fields within respective DAIs can be set by base station 110 and can vary per-UE, per-cell, or per DAI, or can be a standard size established by network protocols. Thus, in one instance, wireless message 422 can include a number of data bits suitable to identify each carrier employed for the multi-carrier wireless communication, each carrier available to base station 110, or each carrier assigned to UE 120. Alternatively, wireless message 422 can include a number of data bits suitable to identify a number of carriers employed for the multi-carrier wireless communication, a number of carriers available to base station 110, or a number of carriers assigned to UE 120. In yet another case, wireless message 422 can include a number of data bits suitable to minimize control channel blind decoding based on size matching between an UL DCI format and a DL DCI format.

The number of wireless carriers signaled by wireless message 422 (or a set of such wireless messages) can also vary, and can be configured by base station 110. In one instance, the number of wireless carriers can be equal to a number of anchor carriers employed by base station 110. In an alternative instance, the number of wireless carriers can be equal to or less than a total number of carriers available to base station 110, or assigned to UE 120 for the multi-carrier wireless communication. Where multiple carriers are signaled by wireless message 422, a plurality of DAIs can be employed, one for each carrier, or at least a subset of the DAIs can signal a number of transmissions on two or more carriers within a DL bundling window. Thus, wireless message 422 can contain, as one example, separate data fields specifying per-carrier number of transmissions for each of the number of wireless carriers. Alternatively, wireless message 422 can contain one or more aggregated data fields specifying a set of per-carrier numbers of transmissions for a plurality of the number of wireless carriers.

In accordance with one aspect, multi-carrier signal apparatus 402 can employ a network configuration or standard to interpret wireless message 422 and a DAI(s) included therein. Further, filtering module 412 can obtain a network configuration identifying a number of wireless carriers, including at least the second wireless carrier, that are specified in wireless message 422. Additionally, mediation module 414 can employ the network configuration to identify a per-carrier number of transmissions assigned to the UL feedback resource for each of the number of wireless carriers. This aspect can be implemented, for instance, where wireless message 422 comprises a plurality of DAIs specifying numbers of DL transmissions for respective carriers, or a single DAI that is configured with a logical AND operation to do likewise.

With reference again to FIG. 1, it can be appreciated that in some wireless communication implementations, control and data can be configured to always be delivered on the same carrier. For multi-carrier operation, however, it can be appreciated that it can be possible for control and data to be transmitted from different carriers. Signaling performed in this manner, where control (e.g., PDCCH) signaling is used to direct data (e.g., PDSCH/PUSCH) signaling on at least a different carrier, is referred to herein and generally in the art as cross-carrier signaling. In one example, multi-carrier control signaling can be generated using separate coding of DL assignments and UL grants for each component carrier based on DCI format(s) for single carrier with an additional carrier indicator field of 0-3 bits. In the case of 0 bits, a carrier indicator can be omitted. Consequently, it can be appreciated that the carrier association of UL ACK/NAK in response to a data transmission can have two options: (1) an UL carrier for UL ACK/NAK and a DL carrier for DL data are always associated, or (2) an UL carrier for UL ACK/NAK and a DL carrier for DL control are always associated.

Figure 5:
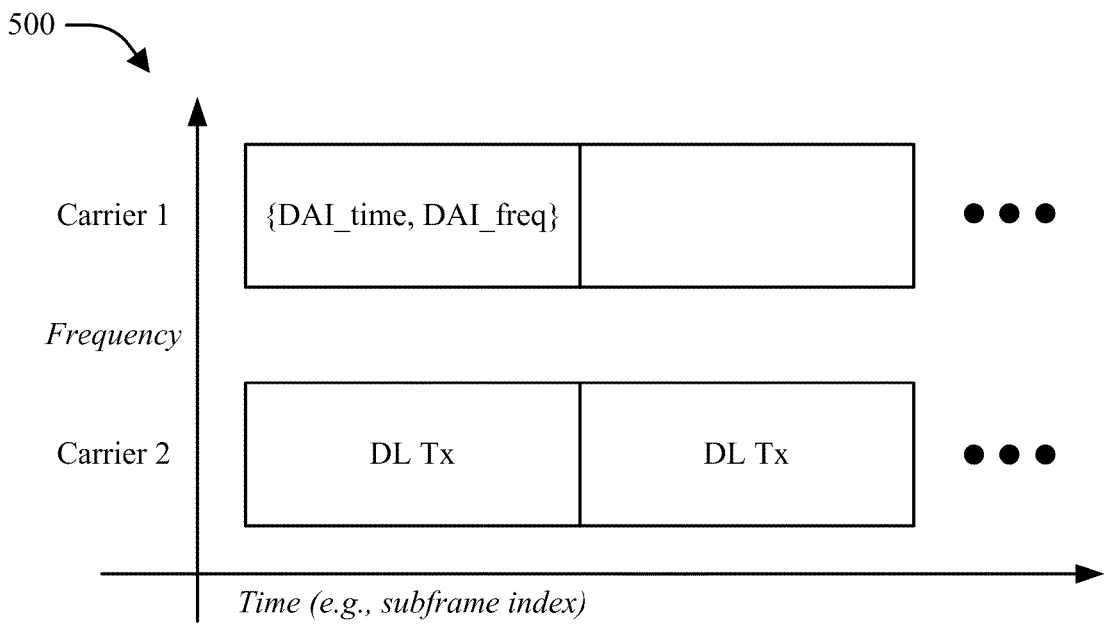
FIG. 5 illustrates an example downlink assignment index (DAI) design that can be employed in a wireless communication system.

Based on at least the above discussion, it can be appreciated that the existence of the DAI in UL assignments can facilitate efficient ACK/NAK feedback for TDD systems and/or other suitable systems. However, as further noted above, UE 120 can in some cases be configured with multiple component carriers. Thus, in some cases, the concept of DAI for single-carrier systems can be extended to multi-carrier scenarios, where instead of indicating the number of DL assignments over the bundling window, the DAI can indicate the number of DL assignments over multiple carriers (e.g., over frequency). Accordingly, for TDD systems, two DAIs can be utilized: a time-based DAI (DAI_time), which indicates the total (or accumulative) DL assignments in a given bundling window, and a frequency-based DAI (DAI_freq) that indicates the total number of DL carriers that have at least one DL assignment in the given DL subframe bundling window. This DAI configuration is illustrated in further detail by diagram 500 in FIG. 5.

In accordance with various aspects described herein, DAI signaling can be generated and/or processed within system 100 such that DAI signaling provided on a given carrier can provide a specific number of DL transmission assignments applied to a different carrier, thereby further improving DAI design over the techniques illustrated in diagram 500. It should be appreciated that the various examples provided herein can be utilized in place of, or complementary to, the {DAI_time, DAI_freq} structure illustrated in diagram 500.

In accordance with one aspect, base station 110 and UE 120 in system 100 can utilize cross-carrier DAI signaling for indicating and processing DL assignment information corresponding to various carriers. Thus, for example, base station 100 can configure at least one indication of a number of DL transmission assignments for one or more carriers to include index information (e.g., a carrier index field (CIF) or the like) that associates the one or more carriers with the number of DL transmission assignments with which they are associated. Correspondingly, UE 120 can utilize transmission assignment analyzer 122 and/or other suitable means to identify one or more carriers corresponding to transmission assignment signaling via index information, such as a CIF or the like, provided in the transmission assignment signaling.

By way of example, cross-carrier DAI signaling can be implemented by base station 110 and/or UE 120 in the following manner. While the following example assumes a two-carrier allocation, it should be appreciated that the concepts described and illustrated herein can be applied for any suitable number of carriers. In one example, UE 120 can be configured with two component carriers denoted by C1 and C2, for the following two scenarios: (1) DL data transmission(s) on C1 and one UL data transmission on C2; and (2) two DL data transmissions in the bundling window on C1, one DL data transmission in the bundling window on C2, and one UL data transmission on C2. In scenario (1), it can be appreciated that the DAI field in the DL control signaling that assigns UL data transmission on C2 is meaningless, as there is no corresponding DL data transmission on C2. Further, in scenario (2), it can be appreciated that the DAI field in the DL control signaling that assigns UL transmission on C2 would be more useful if it was configured to indicate the total number of DL data transmissions on C1, instead of that of C2, as there are 2 DL data transmissions on C1 but only one on C2.

Figure 6:
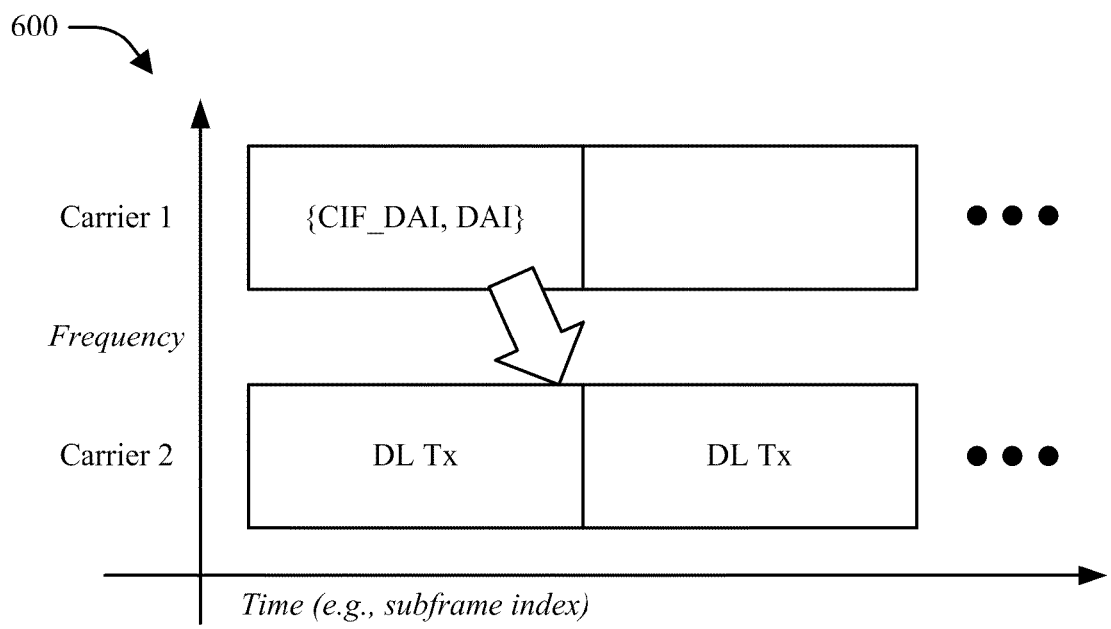
FIGS. 6-8 illustrate respective techniques for enhanced DAI design for a multi-carrier wireless environment in accordance with various aspects described herein.

In both of the above scenarios, it can be appreciated that it would be desirable if the DAI field in the DL signaling that assigns UL data transmission on C2 could also indicate the total number of DL data transmissions in the bundling window for a different carrier (e.g., such that the DAIs provide cross-carrier indication). Alternatively, it can be appreciated that other cases of cross-carrier DAI signaling would similarly be desirable. Accordingly, cross-carrier DAI signaling can be implemented as follows. In the event that M component carriers are configured for UE 120 (or a corresponding cell), for each UL or DL component, a CIF can be introduced for DAI (e.g., CIF_DAI) that has a range of 0 to N bits, where $N=\mathrm{ceil}(\log_2(M))$. An example of cross-carrier DAI signaling that can be generated and utilized in this manner is illustrated by diagram 600 in FIG. 6. It should be appreciated, however that the number of bits utilized for the CIF_DAI is not required to be $\mathrm{ceil}(\log_2(M))$ such that the entire space of M component carriers can be addressed; instead, CIF values can be configured to apply only to a subset of carriers (e.g., anchor carriers and/or any other suitable selected group(s) of carriers), respective groups of more than one carrier, and/or any other suitable CIF-to-carrier mapping.

By way of a specific illustrative example, a CIF can be a fixed 3-bit field that facilitates a UE-specific mapping of possible CIF values to respective carriers. Accordingly, for example, a value of 000 could be utilized to indicate a first carrier, a value of 001 could be utilized to indicate a second carrier, a value of 010 could be utilized to indicate the first carrier and the second carrier, and so on. Alternatively, it should be appreciated that any suitable mapping of CIF configurations to carriers could be utilized.

In another example, the number of bits utilized for CIF_DAI can be chosen by considering the possible size-matching between DL DCI formats and UL DCI formats such that, e.g., PDCCH blind decoding and/or other suitable decoding operations can be minimized (e.g., by having the same DL/UL DCI format sizes). For example, if a DL DCI has L bits and a corresponding UL DCI has L−1 bits before size-matching, a 1-bit CIF_DAI can be chosen such that no extra zero-padding bits are necessary. By doing so, it can be appreciated that a tradeoff can be achieved between control overhead and flexibility in cross-carrier DAI signaling. In a further example, for a given number of bits utilized for CIF_DAI, UE 120 can be configured via a radio resource control (RRC) entity and/or other suitable mechanisms to identify the carrier(s) addressed by the CIF_DAI. In an additional example, the number of bits utilized for CIF_DAI can be UE-specific, cell-specific, and/or determined in any suitable uniform or non-uniform manner throughout system 100.

Figure 7:
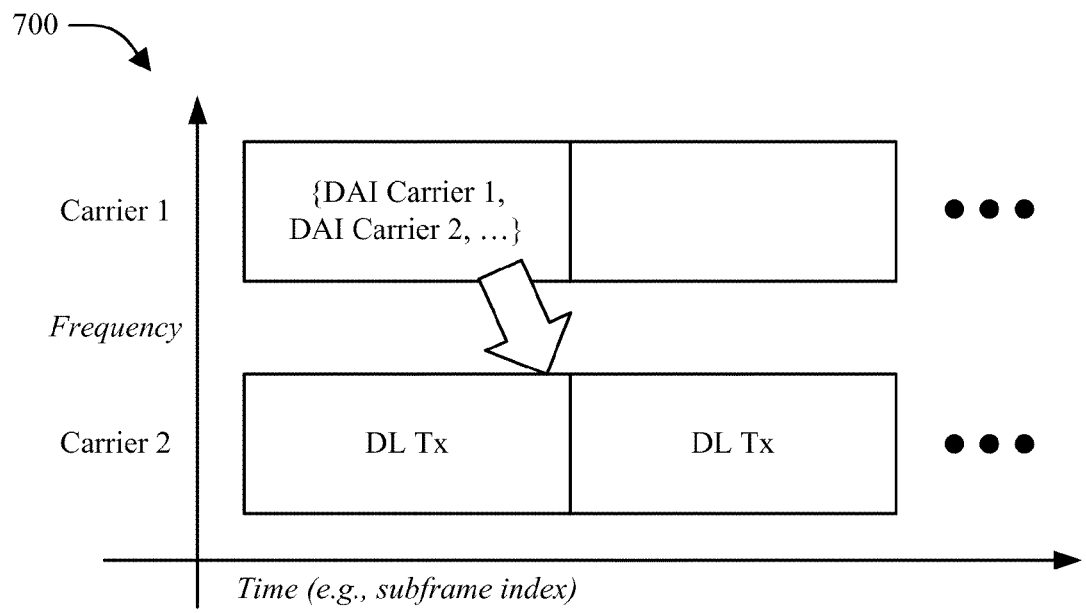

In accordance with another aspect, base station 110 can facilitate signaling indications of DL transmission assignments on multiple carriers by transmitting multiple DAIs for the multiple carriers in a corresponding UL or DL assignment. An example of multiple DAI signaling that can be conducted in this manner is illustrated by diagram 700 in FIG. 7. With regard to base station 110 in system 100, assignment signaling generator 116 and/or other suitable associated modules can facilitate multiple DAI signaling by configuring a plurality of indications to specify numbers of DL transmission assignments associated with respective carriers in an associated plurality of carriers. Upon generation of such indications, the plurality of indications can be transmitted by transceiver 118 on one control signal or multiple (e.g., two or more) control signals. The control signals can be communicated via, e.g., PDCCH and/or any other suitable channel(s). In the event that two or more control signals are utilized, the control signals can be transmitted on one carrier or multiple (e.g., two or more) carriers.

Correspondingly, at UE 120, transceiver 118 can be utilized to obtain transmission assignment signaling provided by base station 110 via one control signal or multiple control signals (on one or more carriers) as described above. Based on the transmission assignment signaling, transmission assignment analyzer 122 and/or other mechanisms associated with UE 120 can determine a plurality of numbers of DL transmission assignments associated with respective carriers in an associated plurality of carriers.

In one example, multiple DAIs can be transmitted by base station 110 for multiple carriers in a UL or DL assignment in the following manner. For example, instead of utilizing the {DAI value, CIF_DAI} structure as discussed above for cross-carrier DAI signaling, base station 110 can transmit N≤M DAIs in each UL or DL assignment, where M is the number of component carriers, in the form {DAI_1, DAI_2, . . . , DAI_N} or the like. In accordance with one aspect, the set {DAI_1, DAI_2, . . . , DAI_N} can be individually coded (e.g., coded on a per-indication basis) or jointly coded.

In another example, as implied by N≤M it can be appreciated that DAIs need not in all cases be provided for all M component carriers. Instead, in some cases N carriers can be selected that are associated with, e.g., anchor carriers and/or any other selection of carriers, which can be equal to or less than M. In a further example, in the event that DAIs are provided for less than all component carriers assigned to a given UE 120, UE 120 can be operable to map respective DAIs to carriers in various manners. For example, CIF information can be provided with one or more DAIs. Alternatively, UE 120 can leverage a set of mappings between a number of DAIs provided in transmission assignment signaling and the carriers to which the DAIs refer. Such mappings can be static mappings (e.g., L3-configured static mappings) and/or constructed in any other suitable manner. In a further example, multiple mappings can be provided for different numbers of DAIs, such that transmission assignment signaling with differing numbers of DAIs (e.g., 2 DAIs, 3 DAIs, etc.) can correspond to different sets of carriers utilized within system 100.

Figure 8:
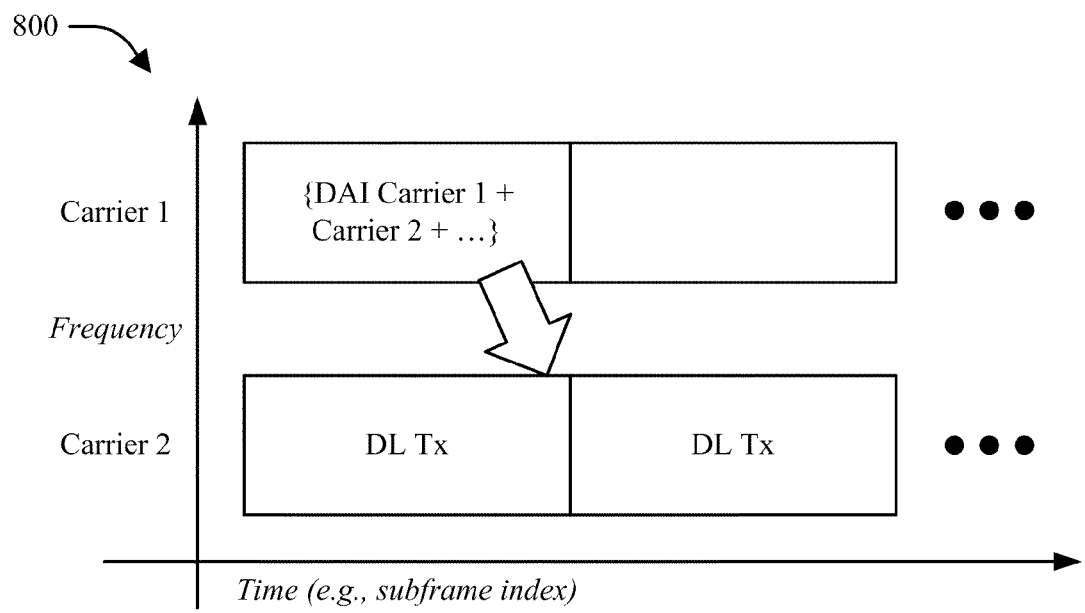

In accordance with still another aspect, one or more DAI values can be provided by base station 110 within transmission assignment signaling that cover multiple carriers in a corresponding UL assignment, such that the DAI signaling is aggregated over frequency (e.g., multiple carriers) and time (e.g., over a DL subframe bundling window). An example of aggregated DAI signaling that can be constructed in this manner is illustrated by diagram 800 in FIG. 8. With regard to base station 110 in system 100, transmission assignment manager 114 and/or other suitable modules can be utilized to configure at least one indication (e.g., a DAI) to specify a combined number of DL transmission assignments associated with one or more first carriers and one or more second carriers. Correspondingly, at UE 120, transmission assignment analyzer 122 can be utilized to determine a combined number of DL transmission assignments associated with one or more first carriers and one or more second carriers based on received transmission assignment signaling. In one non-limiting example case, transmission assignment signaling provided by base station 110 to UE 120 can include an indication and/or other information that specifies a number of DL transmission assignments associated with substantially all carriers in a set of carriers associated with one or more entities in system 100.

In one example, in the event that M component carriers are utilized, base station 110 can construct K≥1 DAIs, where each DAI covers $M_k$ carriers such that $M_1+M_2+\ldots+M_K=M$. In one example, the respective K DAIs can be statically or semi-statically partitioned over the M component carriers in any suitable uniform or non-uniform manner. Thus, by way of illustration, in a 5-carrier system, a first DAI can correspond to carriers 1 and 2, a second DAI can correspond to carriers 3 and 4, and a third DAI can correspond to carrier 5. It should be appreciated, however, that any suitable mapping can be utilized. In another example, for the special case of K=1 as noted above, a DAI in an UL assignment or DL assignment can indicate the total number of DL assignments in the DL subframe bundling window over all carriers. In a further example, aggregated DAI signaling as described above can utilize CIF information in a similar manner to the cross-carrier DAI signaling illustrated by FIG. 6, multiple DAIs in a similar manner to that shown by FIG. 7, and/or any other suitable properties to facilitate the DAI signaling.

In accordance with a further aspect, as discussed above, a carrier utilized by UE 120 for UL ACK/NAK feedback can be associated with corresponding DL data transmission or DL control transmissions (e.g., PDSCH or PDCCH, etc.). As a result, it can be appreciated that base station 110 and/or UE 120 can leverage at least two options with respect to DAI signaling association. In a first example, DAI can be configured to always count the number of DL data transmissions over a given carrier. Alternatively, in a second example, DAI can be configured to always count the number of DL control transmissions over the given carrier, although some DL control may signal DL data transmissions over different carriers. Thus, in accordance with one aspect, base station 110 can determine at least one of a number of DL control signal transmission assignments or a number of DL data transmission assignments associated with one or more carriers such that UE 120 can retrieve such information from transmission assignment signaling received from base station 110. In one example, an option utilized for DAI association can be selected by base station 110 and/or UE 120 from the above options and/or other suitable options via an overarching network specification or other similar means, cell-specific or UE-specific configuration, and/or in any other suitable manner.

In accordance with an additional aspect, the number of bits utilized for a DAI can be leveraged to imply the carrier(s) to which the DAI refers. Accordingly, it can be appreciated that in addition to the payload of the DAI, the number of bits utilized for the DAI can additionally be utilized by base station 110 and/or UE 120 to facilitate one or more of the operations described above. In one example, an L3-configured mapping and/or other suitable means can be utilized to map respective DAI bit sizes to corresponding carriers, in a similar manner to that described for leveraging of a number of DAIs with respect to FIG. 7 above.

Referring now to FIGS. 9-13, various methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 9:
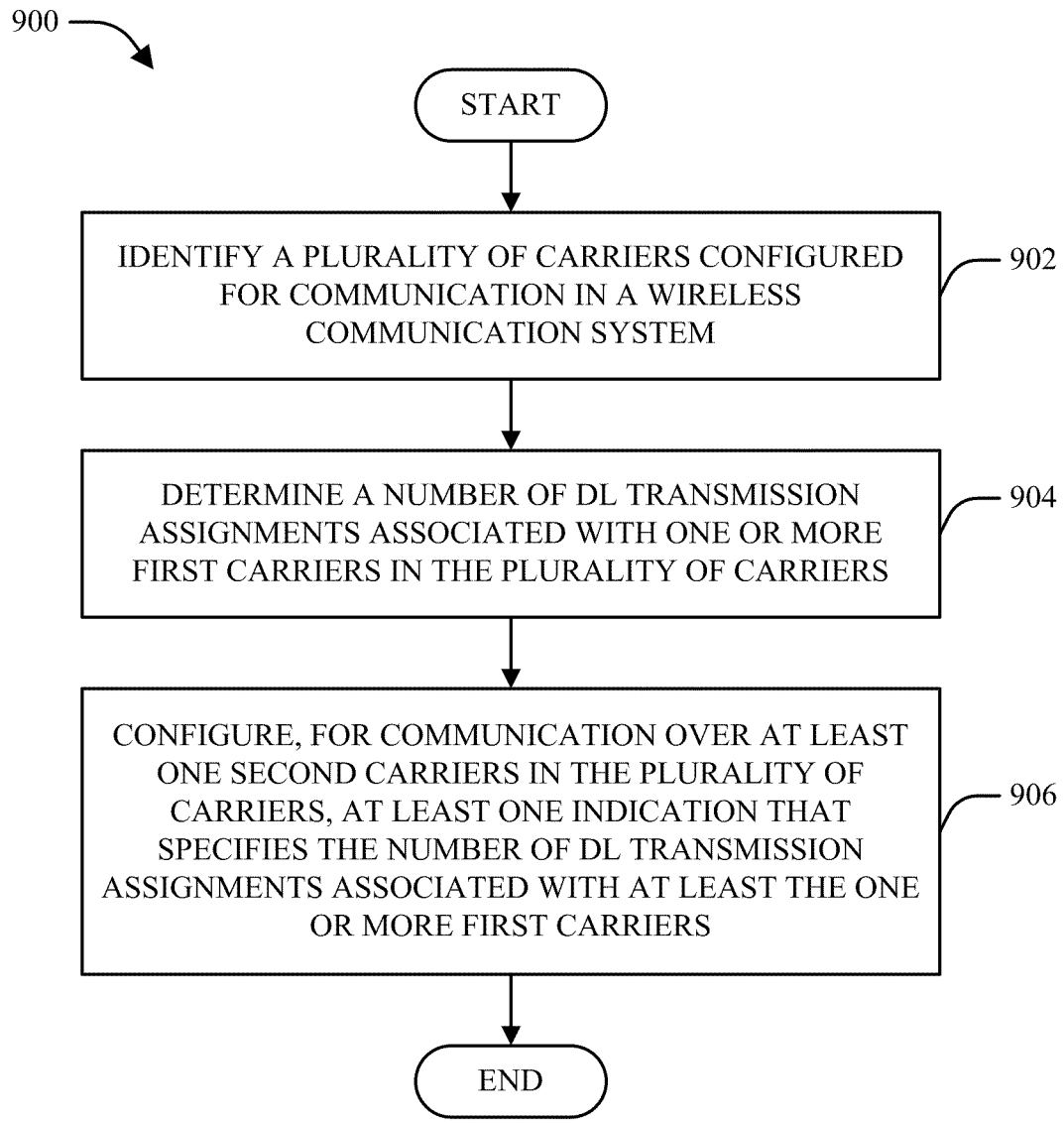
FIGS. 9-12 are flow diagrams of respective methods for generating signaling indicative of downlink transmission assignments made within a multi-carrier wireless communication environment.

With reference to FIG. 9, illustrated is a first methodology 900 for generating signaling indicative of downlink transmission assignments made within a multi-carrier wireless communication environment. It is to be appreciated that methodology 900 can be performed by, for example, a base station (e.g., base station 110) and/or any other appropriate network entity. Methodology 900 begins at block 902, wherein a plurality of carriers configured for communication in a wireless communication system is identified (e.g., by a carrier analysis module 112). At block 904, a number of DL transmission assignments associated with one or more first carriers in the plurality of carriers is determined (e.g., by a transmission assignment manager 114). At block 906, at least one indication is configured (e.g., by an assignment signaling generator 116) for communication over at least one second carriers in the plurality of carriers that specifies the number of DL transmission assignments associated with at least the one or more first carriers.

Figure 10:
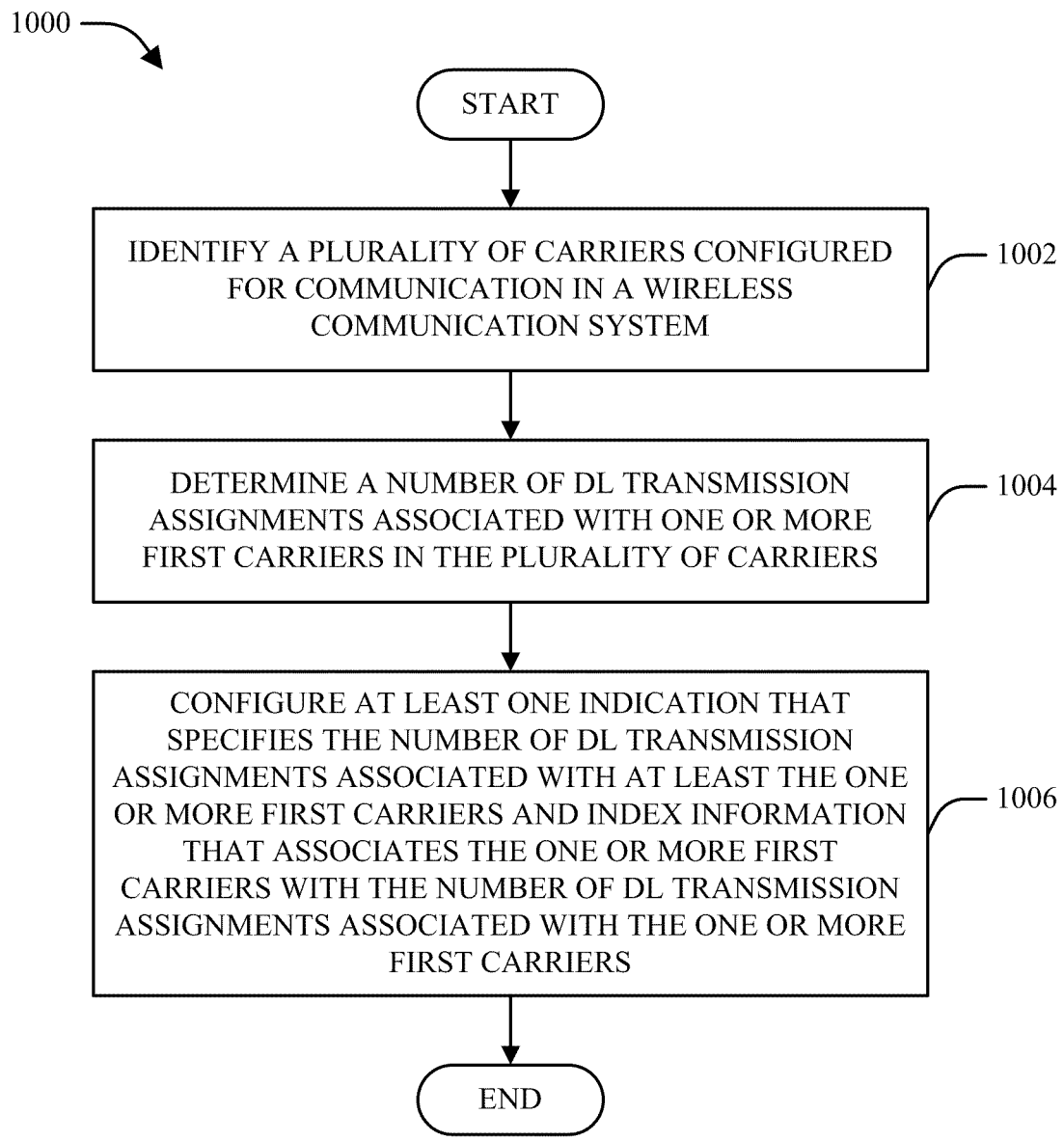

FIG. 10 illustrates a second methodology 1000 for generating signaling indicative of downlink transmission assignments made within a multi-carrier wireless communication environment. It is to be appreciated that methodology 1000 can be performed by, for example, an eNB and/or any other appropriate network entity. Methodology 1000 begins at block 1002, wherein a plurality of carriers configured for communication in a wireless communication system is identified. At block 1004, a number of DL transmission assignments associated with one or more first carriers in the plurality of carriers is determined. At block 1006, at least one indication is configured that specifies the number of DL transmission assignments associated with at least the one or more first carriers and index information that associates the one or more first carriers with the number of DL transmission assignments associated with the one or more first carriers.

Figure 11:
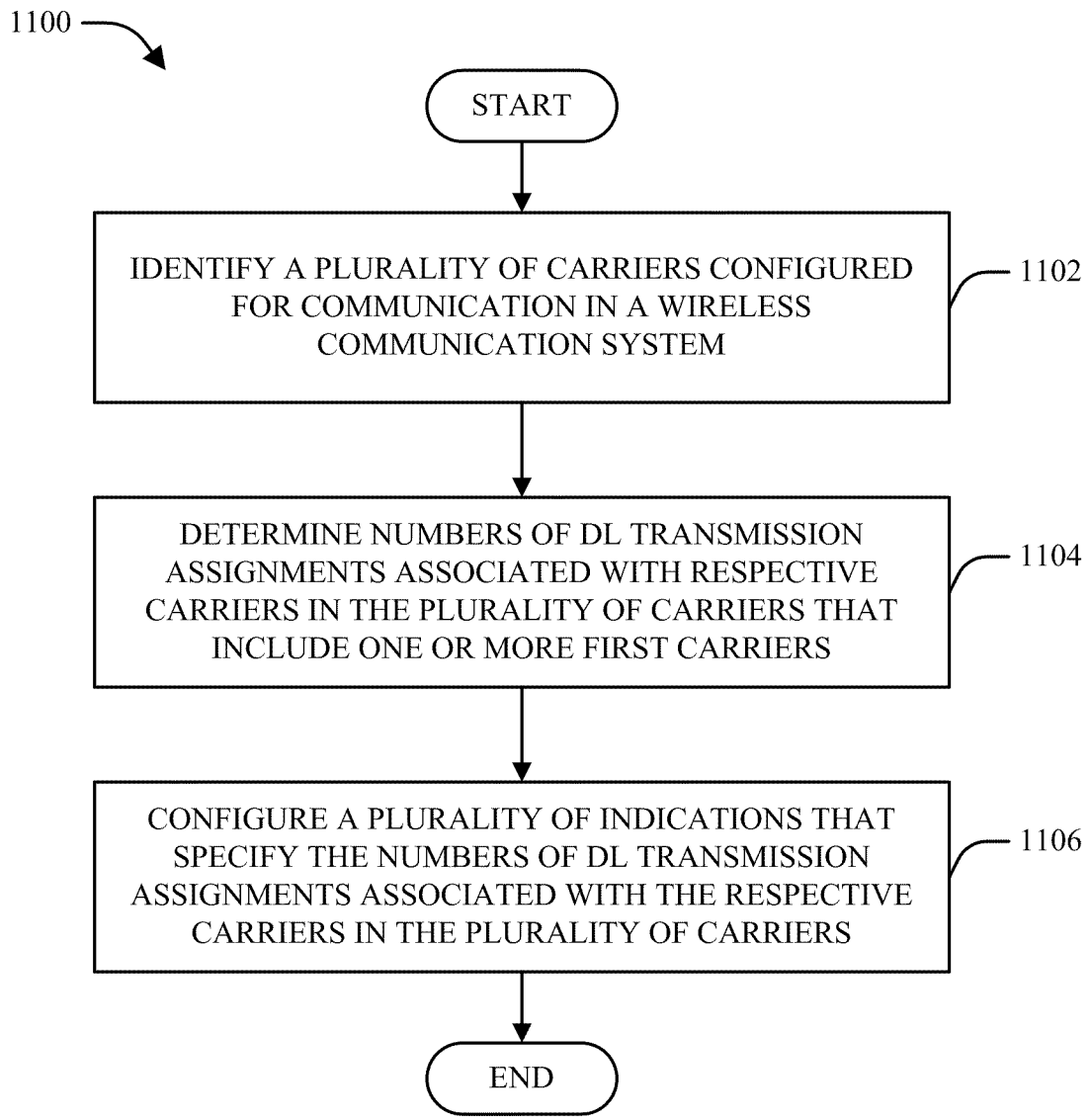

Turning now to FIG. 11, a third methodology 1100 for generating signaling indicative of downlink transmission assignments made within a multi-carrier wireless communication environment. Methodology 1100 can be performed by, for example, a network cell and/or any other appropriate network entity. Methodology 1100 begins at block 1102, wherein a plurality of carriers configured for communication in a wireless communication system is identified. At block 1104, numbers of DL transmission assignments are determined that are associated with respective carriers in the plurality of carriers that include one or more first carriers. At block 1106, a plurality of indications is configured that specify the numbers of DL transmission assignments associated with the respective carriers in the plurality of carriers.

Figure 12:
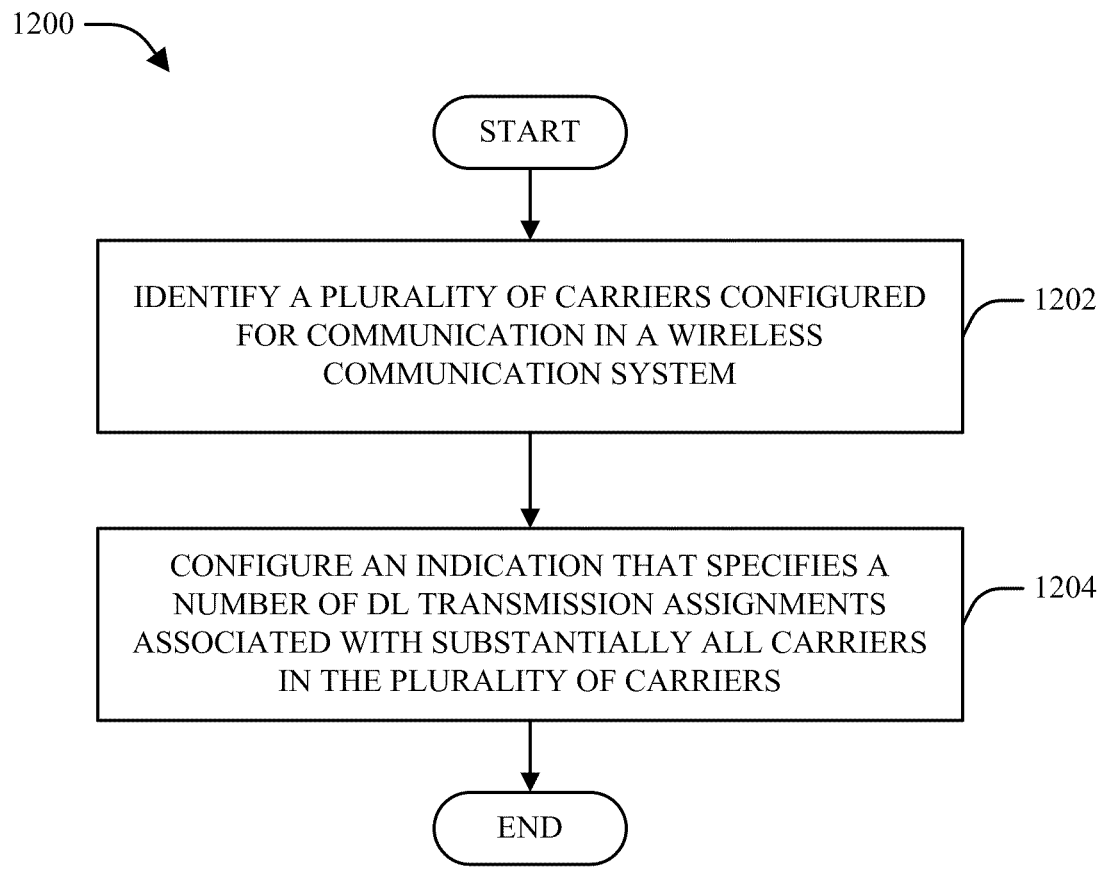

FIG. 12 illustrates a fourth methodology 1200 for generating signaling indicative of downlink transmission assignments made within a multi-carrier wireless communication environment. Methodology 1200 can be performed by, for example, a base station and/or any other appropriate network entity. Methodology 1200 begins at block 1202, wherein a plurality of carriers configured for communication in a wireless communication system is identified. At block 1204, an indication is configured that specifies a number of DL transmission assignments associated with substantially all carriers in the plurality of carriers.

Figure 13:
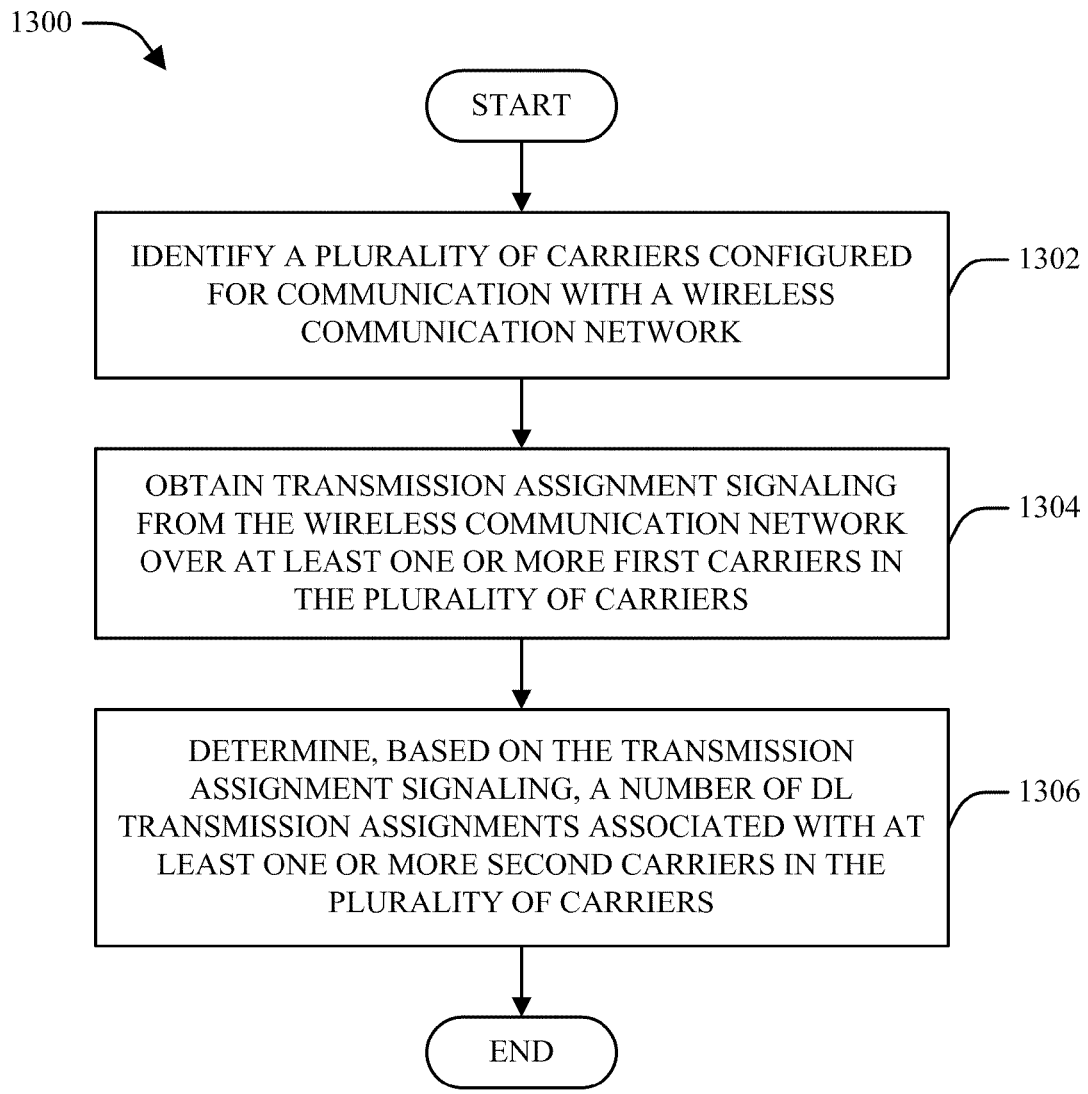
FIG. 13 is a flow diagram of a method for processing transmission assignment signaling that includes multi-carrier assignment information.

Turning to FIG. 13, a methodology 1300 for processing transmission assignment signaling that includes multi-carrier assignment information is illustrated. Methodology 1300 can be performed by, for example, a UE (e.g., UE 120) and/or any other suitable network entity. Methodology 1300 begins at block 1302, wherein a plurality of carriers configured for communication with a wireless communication network is identified (e.g., via a carrier analysis module 112). At block 1304, transmission assignment signaling is obtained from the wireless communication network (e.g., via a transceiver 118) over at least one or more first carriers in the plurality of carriers. At block 1306, a number of DL transmission assignments associated with at least one or more second carriers in the plurality of carriers is determined (e.g., by a transmission assignment analyzer 122) based on the transmission assignment signaling.

Figure 14:
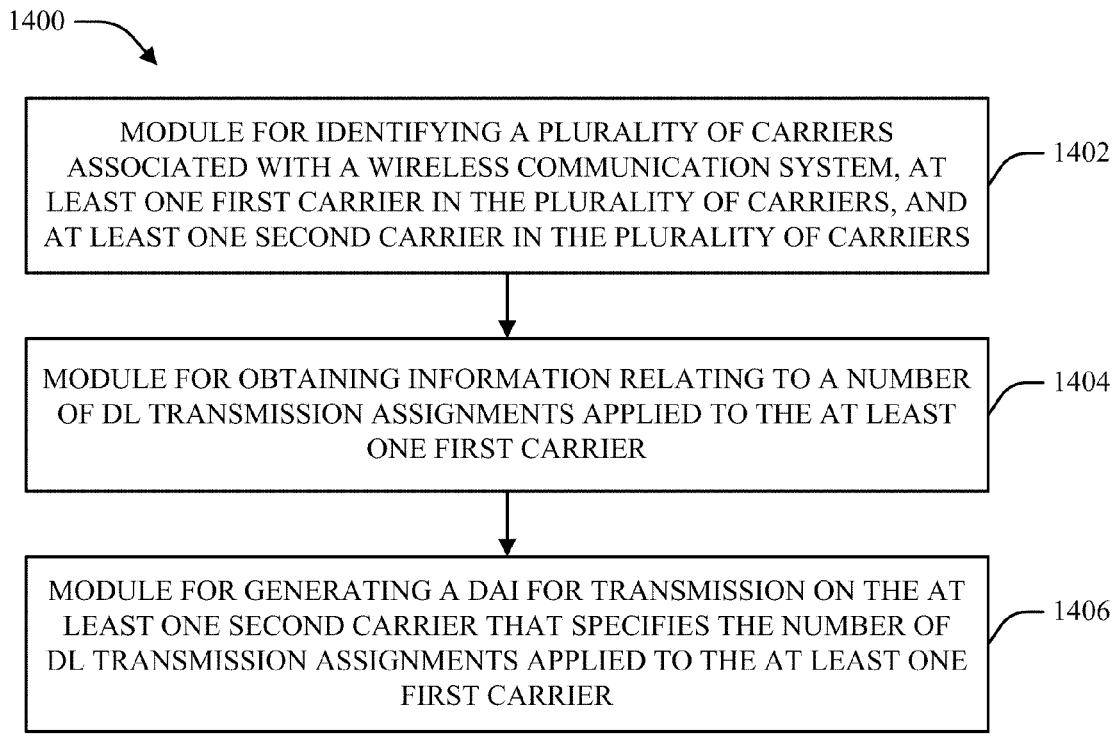
FIGS. 14-15 are block diagrams of respective apparatuses that facilitate generation and processing of downlink assignment indicator signaling in a multi-carrier wireless communication system.
Figure 15:
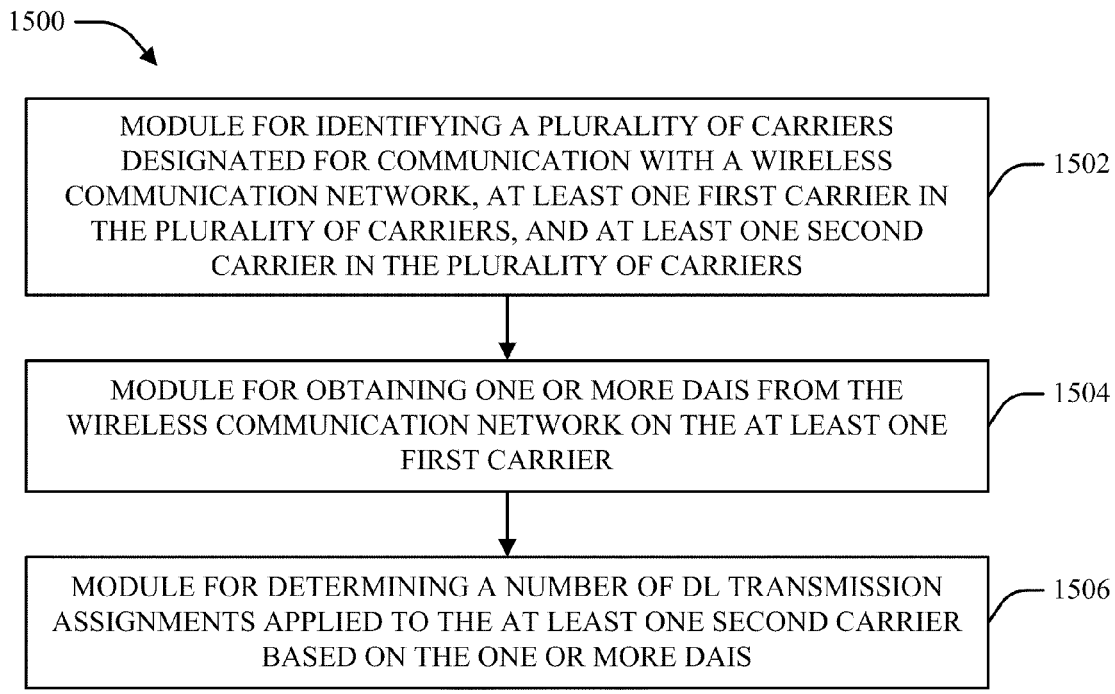

Referring next to FIGS. 14-15, respective apparatuses 1400-1500 that can be implemented in accordance with various aspects herein are illustrated. It is to be appreciated that apparatuses 1400-1500 are represented as including functional blocks, which can be functional blocks that represent functions implemented by a processor, software, or combination thereof (e.g., firmware).

With reference first to FIG. 14, a first apparatus 1400 that facilitates generation and processing of downlink assignment indicator signaling in a multi-carrier wireless communication system is illustrated. Apparatus 1400 can be implemented by a base station (e.g., base station 110) and/or any other suitable network entity and can include a module 1402 for identifying a plurality of carriers associated with a wireless communication system, at least one first carrier in the plurality of carriers, and at least one second carrier in the plurality of carriers; a module 1404 for obtaining information relating to a number of DL transmission assignments applied to the at least one first carrier; and a module 1406 for generating a DAI for transmission on the at least one second carrier that specifies the number of DL transmission assignments applied to the at least one first carrier.

FIG. 15 illustrates a second apparatus 1500 that facilitates generation and processing of downlink assignment indicator signaling in a multi-carrier wireless communication system. Apparatus 1500 can be implemented by a mobile terminal (e.g., UE 120) and/or any other suitable network entity and can include a module 1502 for identifying a plurality of carriers designated for communication with a wireless communication network, at least one first carrier in the plurality of carriers, and at least one second carrier in the plurality of carriers; a module 1504 for obtaining one or more DAIs from the wireless communication network on the at least one first carrier; and a module 1506 for determining a number of DL transmission assignments applied to the at least one second carrier based on the one or more DAIs.

Figure 16:
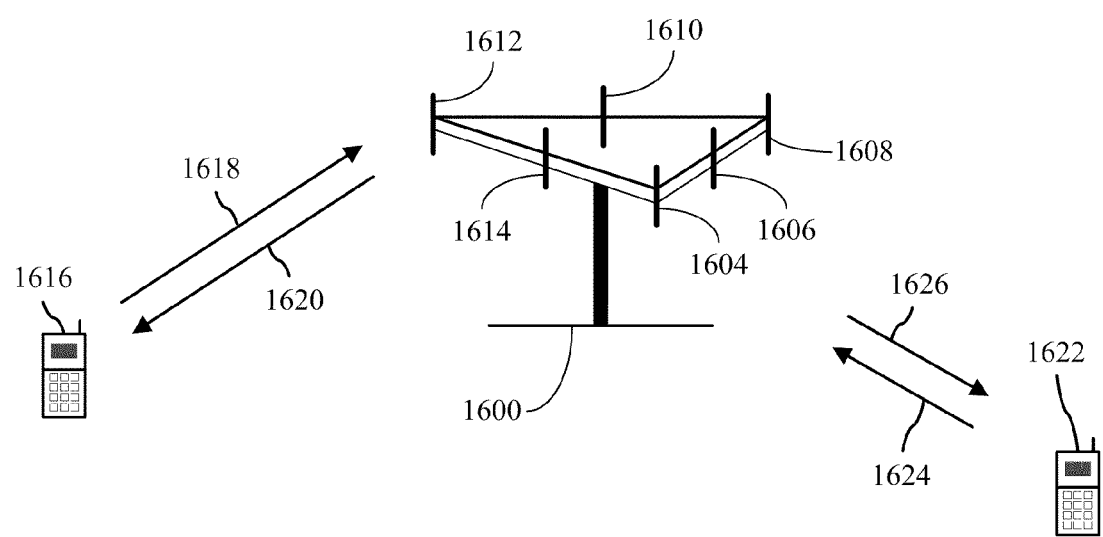
FIG. 16 illustrates a wireless multiple-access communication system in accordance with various aspects set forth herein.

Referring now to FIG. 16, an illustration of a wireless multiple-access communication system is provided in accordance with various aspects. In one example, an access point 1600 (AP) includes multiple antenna groups. As illustrated in FIG. 16, one antenna group can include antennas 1604 and 1606, another can include antennas 1608 and 1610, and another can include antennas 1612 and 1614. While only two antennas are shown in FIG. 16 for each antenna group, it should be appreciated that more or fewer antennas may be utilized for each antenna group. In another example, an access terminal 1616 can be in communication with antennas 1612 and 1614, where antennas 1612 and 1614 transmit information to access terminal 1616 over forward link 1620 and receive information from access terminal 1616 over reverse link 1618. Additionally and/or alternatively, access terminal 1622 can be in communication with antennas 1606 and 1608, where antennas 1606 and 1608 transmit information to access terminal 1622 over forward link 1626 and receive information from access terminal 1622 over reverse link 1624. In a frequency division duplex system, communication links 1618, 1620, 1624 and 1626 can use different frequency for communication. For example, forward link 1620 may use a different frequency than that used by reverse link 1618.

Each group of antennas and/or the area in which they are designed to communicate can be referred to as a sector of the access point. In accordance with one aspect, antenna groups can be designed to communicate to access terminals in a sector of areas covered by access point 1600. In communication over forward links 1620 and 1626, the transmitting antennas of access point 1600 can utilize beamforming in order to improve the signal-to-noise ratio of forward links for the different access terminals 1616 and 1622. Also, an access point using beamforming to transmit to access terminals scattered randomly through its coverage causes less interference to access terminals in neighboring cells than an access point transmitting through a single antenna to all its access terminals.

An access point, e.g., access point 1600, can be a fixed station used for communicating with terminals and can also be referred to as a base station, an eNB, an access network, and/or other suitable terminology. In addition, an access terminal, e.g., an access terminal 1616 or 1622, can also be referred to as a mobile terminal, user equipment, a wireless communication device, a terminal, a wireless terminal, and/or other appropriate terminology.

Figure 17:
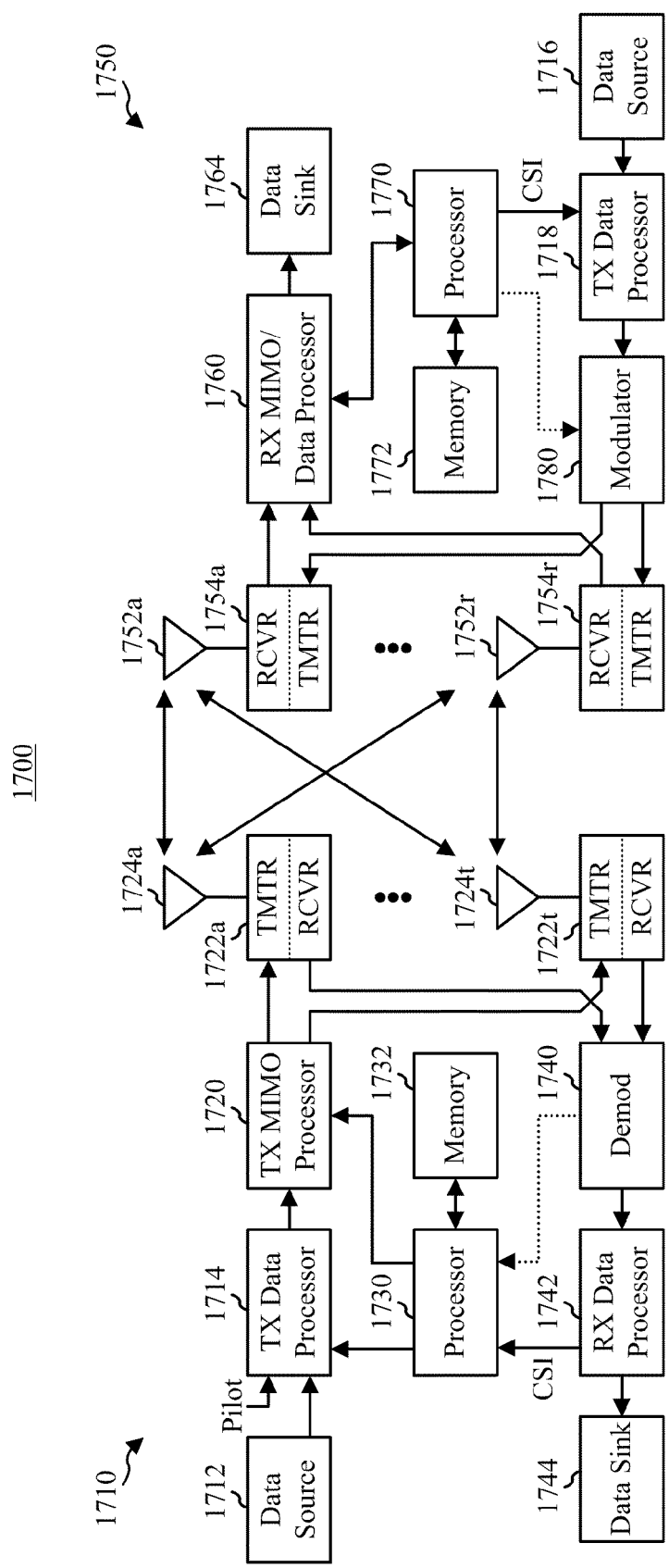
FIG. 17 is a block diagram illustrating an example wireless communication system in which various aspects described herein can function.

Referring now to FIG. 17, a block diagram illustrating an example wireless communication system 1700 in which various aspects described herein can function is provided. In one example, system 1700 is a multiple-input multiple-output (MIMO) system that includes a transmitter system 1710 and a receiver system 1750. It should be appreciated, however, that transmitter system 1710 and/or receiver system 1750 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1710 and/or receiver system 1750 described herein could be utilized in connection with a single output to single input antenna system.

In accordance with one aspect, traffic data for a number of data streams are provided at transmitter system 1710 from a data source 1712 to a transmit (TX) data processor 1714. In one example, each data stream can then be transmitted via a respective transmit antenna 1724. Additionally, TX data processor 1714 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1750 to estimate channel response. Back at transmitter system 1710, the multiplexed pilot and coded data for each data stream can be modulated (e.g., symbol mapped) based on a particular modulation scheme (e.g., BPSK, QPSK, M-PSK, or M-QAM) selected for each respective data stream in order to provide modulation symbols. In one example, data rate, coding, and modulation for each data stream can be determined by instructions performed on and/or provided by processor 1730.

Next, modulation symbols for all data streams can be provided to a TX MIMO processor 1720, which can further process the modulation symbols (e.g., for OFDM). TX MIMO processor 1720 can then provide $N_T$ modulation symbol streams to $N_T$ transceivers 1722a through 1722t. In one example, each transceiver 1722 can receive and process a respective symbol stream to provide one or more analog signals. Each transceiver 1722 can then further condition (e.g., amplify, filter, and upconvert) the analog signals to provide a modulated signal suitable for transmission over a MIMO channel. Accordingly, $N_T$ modulated signals from transceivers 1722a through 1722t can then be transmitted from $N_T$ antennas 1724a through 1724t, respectively.

In accordance with another aspect, the transmitted modulated signals can be received at receiver system 1750 by $N_R$ antennas 1752a through 1752r. The received signal from each antenna 1752 can then be provided to respective transceivers 1754. In one example, each transceiver 1754 can condition (e.g., filter, amplify, and downconvert) a respective received signal, digitize the conditioned signal to provide samples, and then processes the samples to provide a corresponding "received" symbol stream. An RX MIMO/data processor 1760 can then receive and process the $N_R$ received symbol streams from $N_R$ transceivers 1754 based on a particular receiver processing technique to provide $N_T$ "detected" symbol streams. In one example, each detected symbol stream can include symbols that are estimates of the modulation symbols transmitted for the corresponding data stream. RX processor 1760 can then process each symbol stream at least in part by demodulating, deinterleaving, and decoding each detected symbol stream to recover traffic data for a corresponding data stream. Thus, the processing by RX processor 1760 can be complementary to that performed by TX MIMO processor 1720 and TX data processor 1714 at transmitter system 1710. RX processor 1760 can additionally provide processed symbol streams to a data sink 1764.

In accordance with one aspect, the channel response estimate generated by RX processor 1760 can be used to perform space/time processing at the receiver, adjust power levels, change modulation rates or schemes, and/or other appropriate actions. Additionally, RX processor 1760 can further estimate channel characteristics such as, for example, signal-to-noise-and-interference ratios (SNRs) of the detected symbol streams. RX processor 1760 can then provide estimated channel characteristics to a processor 1770. In one example, RX processor 1760 and/or processor 1770 can further derive an estimate of the "operating" SNR for the system. Processor 1770 can then provide channel state information (CSI), which can comprise information regarding the communication link and/or the received data stream. This information can include, for example, the operating SNR. The CSI can then be processed by a TX data processor 1718, modulated by a modulator 1780, conditioned by transceivers 1754a through 1754r, and transmitted back to transmitter system 1710. In addition, a data source 1716 at receiver system 1750 can provide additional data to be processed by TX data processor 1718.

Back at transmitter system 1710, the modulated signals from receiver system 1750 can then be received by antennas 1724, conditioned by transceivers 1722, demodulated by a demodulator 1740, and processed by a RX data processor 1742 to recover the CSI reported by receiver system 1750. In one example, the reported CSI can then be provided to processor 1730 and used to determine data rates as well as coding and modulation schemes to be used for one or more data streams. The determined coding and modulation schemes can then be provided to transceivers 1722 for quantization and/or use in later transmissions to receiver system 1750. Additionally and/or alternatively, the reported CSI can be used by processor 1730 to generate various controls for TX data processor 1714 and TX MIMO processor 1720. In another example, CSI and/or other information processed by RX data processor 1742 can be provided to a data sink 1744.

In one example, processor 1730 at transmitter system 1710 and processor 1770 at receiver system 1750 direct operation at their respective systems. Additionally, memory 1732 at transmitter system 1710 and memory 1772 at receiver system 1750 can provide storage for program codes and data used by processors 1730 and 1770, respectively. Further, at receiver system 1750, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
identifying a plurality of carriers configured for communication in a wireless communication system;
determining a number of downlink transmission assignments associated with one or more first carriers in the plurality of carriers; and
configuring, for communication over at least one or more second carriers in the plurality of carriers, at least one indication that specifies the number of downlink transmission assignments associated with at least the one or more first carriers.

2. The method of claim 1, wherein the one or more second carriers are disparate from the one or more first carriers.

3. The method of claim 1, wherein the at least one indication comprises downlink assignment index (DAI) signaling.

4. The method of claim 1, wherein the configuring comprises configuring the at least one indication to include index information that associates the one or more first carriers with the number of downlink transmission assignments associated with the one or more first carriers.

5. The method of claim 4, wherein the index information comprises a carrier index field (CIF).

6. The method of claim 1, wherein the configuring comprises configuring the at least one indication to specify one or more of a total number of downlink transmission assignments associated with at least the one or more first carriers or an accumulative number of downlink transmission assignments associated with at least the one or more first carriers.

7. The method of claim 1, wherein the configuring comprises configuring the at least one indication to specify a combined number of downlink transmission assignments associated with the one or more first carriers and the one or more second carriers.

8. The method of claim 1, further comprising transmitting the at least one indication via at least one of a downlink transmission assignment or an uplink transmission assignment.

9. The method of claim 1, wherein the configuring comprises configuring a plurality of indications to specify numbers of downlink transmission assignments associated with respective carriers in the plurality of carriers, and wherein the respective carriers include the one or more first carriers.

10. The method of claim 9, further comprising transmitting the plurality of indications via at least one control signal.

11. The method of claim 10, wherein the configuring further comprises coding the plurality of indications for transmission on the at least one control signal using at least one of per-indication coding or joint coding.

12. The method of claim 1, wherein the configuring comprises configuring the at least one indication to specify a number of downlink transmission assignments associated with substantially all carriers in the plurality of carriers.

13. The method of claim 1, wherein the determining comprises determining at least one of a number of downlink control signal transmission assignments associated with the one or more first carriers or a number of downlink data transmission assignments associated with the one or more first carriers.

14. A wireless communications apparatus, comprising:
a memory that stores data relating to a plurality of carriers configured for communication in a wireless communication system; and
a processor configured to determine a number of downlink transmission assignments associated with one or more first carriers in the plurality of carriers and to configure, for communication over one or more second carriers in the plurality of carriers, at least one indication that specifies the number of downlink transmission assignments associated with at least the one or more first carriers.

15. The wireless communications apparatus of claim 14, wherein the one or more second carriers are disparate from the one or more first carriers.

16. The wireless communications apparatus of claim 14, wherein the processor is further configured to configure the at least one indication to include index information that associates the one or more first carriers with the number of downlink transmission assignments associated with the one or more first carriers.

17. The wireless communications apparatus of claim 14, wherein the processor is further configured to configure the at least one indication to specify a combined number of downlink transmission assignments associated with the one or more first carriers and the one or more second carriers.

18. The wireless communications apparatus of claim 14, wherein the processor is further configured to configure a plurality of indications to specify numbers of downlink transmission assignments associated with respective carriers in the plurality of carriers, and wherein the respective carriers include the one or more first carriers.

19. An apparatus, comprising:
means for identifying a plurality of carriers associated with a wireless communication system, at least one first carrier in the plurality of carriers, and at least one second carrier in the plurality of carriers;
means for obtaining information relating to a number of downlink transmission assignments applied to the at least one first carrier; and
means for generating a downlink assignment index (DAI) for transmission on the at least one second carrier that specifies the number of downlink transmission assignments applied to the at least one first carrier.

20. The apparatus of claim 19, wherein the at least one first carrier is disparate from the at least one second carrier.

21. The apparatus of claim 19, wherein the means for generating comprises means for associating a carrier index field (CIF) that identifies the at least one first carrier with the DAI.

22. The apparatus of claim 19, wherein the means for generating comprises means for generating a DAI that specifies a combined number of downlink transmission assignments applied to the at least one first carrier and the at least one second carrier.

23. The apparatus of claim 19, wherein the means for generating comprises means for generating a plurality of DAIs that specify respective numbers of downlink transmission assignments applied to respectively corresponding sets of one or more carriers in the plurality of carriers.

24. A non-transitory computer-readable medium, comprising:
code for causing a computer to identify a plurality of carriers associated with a wireless communication system, at least one first carrier in the plurality of carriers, and at least one second carrier in the plurality of carriers;

code for causing a computer to obtain information relating to a number of downlink transmission assignments applied to the at least one first carrier; and code for causing a computer to generate a downlink assignment index (DAI) for transmission on the at least one second carrier that specifies the number of downlink transmission assignments applied to the at least one first carrier.

25. The non-transitory computer-readable medium of claim 24, wherein the at least one first carrier is disparate from the at least one second carrier.

26. A method, comprising:
identifying a plurality of carriers configured for communication with a wireless communication network;
obtaining transmission assignment signaling from the wireless communication network over at least one or more first carriers in the plurality of carriers; and
determining, based on the transmission assignment signaling, a number of downlink transmission assignments associated with at least one or more second carriers in the plurality of carriers.

27. The method of claim 26, wherein the one or more second carriers are disparate from the one or more first carriers.

28. The method of claim 26, wherein the determining comprises determining the number of downlink transmission assignments associated with at least the one or more second carriers based on downlink assignment index (DAI) signaling provided in the transmission assignment signaling.

29. The method of claim 26, wherein the determining comprises identifying the one or more second carriers via index information provided in the transmission assignment signaling.

30. The method of claim 29, wherein the index information comprises a carrier index field (CIF).

31. The method of claim 26, wherein the determining comprises determining one or more of a total number of downlink transmission assignments associated with at least the one or more second carriers or an accumulative number of downlink transmission assignments associated with at least the one or more second carriers.

32. The method of claim 26, wherein the determining comprises determining a combined number of downlink transmission assignments associated with the one or more first carriers and the one or more second carriers based on the transmission assignment signaling.

33. The method of claim 26, wherein the transmission assignment signaling comprises at least one of a downlink transmission assignment or an uplink transmission assignment.

34. The method of claim 26, wherein determining comprises determining, based on the transmission assignment signaling, a plurality of numbers of downlink transmission assignments associated with respective carriers in the plurality of carriers, and wherein the respective carriers include the one or more second carriers.

35. The method of claim 34, wherein the obtaining comprises obtaining at least one control signal that includes the transmission assignment signaling.

36. The method of claim 35, wherein the plurality of numbers of downlink transmission assignments are encoded on the at least one control signal via at least one of individual coding or joint coding.

37. The method of claim 26, wherein the determining comprises determining a number of downlink transmission assignments associated with substantially all carriers in the plurality of carriers based on the transmission assignment signaling.

38. The method of claim 26, wherein the determining comprises determining at least one of a number of downlink control signal transmission assignments or a number of downlink data transmission assignments associated with the one or more second carriers based on the transmission assignment signaling.

39. A wireless communications apparatus, comprising:
a memory that stores data relating to a plurality of carriers configured for communication with a wireless communication network; and
a processor configured to obtain transmission assignment signaling from the wireless communication network over at least one or more first carriers in the plurality of carriers and to determine, based on the transmission assignment signaling, a number of downlink transmission assignments associated with at least one or more second carriers in the plurality of carriers.

40. The wireless communications apparatus of claim 39, wherein the one or more second carriers are disparate from the one or more first carriers.

41. The wireless communications apparatus of claim 39, wherein the processor is further configured to identify the one or more second carriers via index information provided in the transmission assignment signaling.

42. The wireless communications apparatus of claim 39, wherein the processor is further configured to determine a combined number of downlink transmission assignments associated with the one or more first carriers and the one or more second carriers based on the transmission assignment signaling.

43. The wireless communications apparatus of claim 39, wherein the processor is further configured to determine, based on the transmission assignment signaling, a plurality of numbers of downlink transmission assignments associated with respective carriers in the plurality of carriers, and wherein the respective carriers include the one or more second carriers.

44. An apparatus, comprising:
means for identifying a plurality of carriers designated for communication with a wireless communication network, at least one first carrier in the plurality of carriers, and at least one second carrier in the plurality of carriers;
means for obtaining one or more downlink assignment indexes (DAIs) from the wireless communication network on the at least one first carrier; and
means for determining a number of downlink transmission assignments applied to the at least one second carrier based on the one or more DAIs.

45. The apparatus of claim 44, wherein the at least one first carrier is disparate from the at least one second carrier.

46. The apparatus of claim 44, wherein the means for determining comprises:
means for identifying a carrier index field (CIF) in the one or more DAIs; and
means for identifying the at least one second carrier based on the CIF.

47. The apparatus of claim 44, wherein the means for determining comprises means for determining a combined number of downlink transmission assignments applied to the at least one first carrier and the at least one second carrier based on the one or more DAIs.

48. The apparatus of claim 44, wherein:
the means for obtaining comprises means for obtaining a plurality of DAIs; and the means for determining comprises means for identifying respective numbers of downlink transmission assignments from respective DAIs in the plurality of DAIs that are applied to respective carriers in the plurality of carriers that include the at least one second carrier.

49. A non-transitory computer-readable medium, comprising:
- code for causing a computer to identify a plurality of carriers designated for communication with a wireless communication network, at least one first carrier in the plurality of carriers, and at least one second carrier in the plurality of carriers that is disparate from the at least one first carrier;
- code for causing a computer to obtain one or more downlink assignment indexes (DAIs) from the wireless communication network on the at least one first carrier; and
- code for causing a computer to determine a number of downlink transmission assignments applied to the at least one second carrier based on the one or more DAIs.

50. The non-transitory computer-readable medium of claim 49, wherein the at least one first carrier is disparate from the at least one second carrier.

* * * * *